US006503077B2

(12) United States Patent
Orth et al.

(10) Patent No.: US 6,503,077 B2
(45) Date of Patent: *Jan. 7, 2003

(54) GELLED ARTICLES CONTAINING TERTIARY AMIDE-TERMINATED POLYAMIDE

(75) Inventors: Stephen D. Orth, Kingsport, TN (US); Mark S. Pavlin, Savannah, GA (US); Richard C. MacQueen, Phillipsburg, NJ (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/967,892

(22) Filed: Sep. 28, 2001

(65) Prior Publication Data

US 2002/0068811 A1 Jun. 6, 2002

Related U.S. Application Data

(63) Continuation-in-part of application No. 09/871,238, filed on May 30, 2001, now abandoned, which is a continuation-in-part of application No. 09/225,889, filed on Jan. 4, 1999, now Pat. No. 6,268,466.

(51) Int. Cl.$^7$ .............................. F23D 3/02; C08L 77/08
(52) U.S. Cl. ....................... 431/288; 528/332; 528/335; 528/339; 528/339.3
(58) Field of Search ............................... 528/335, 332, 528/339, 339.3; 431/288

(56) References Cited

U.S. PATENT DOCUMENTS

| 2,279,137 A | 4/1942 | Guilfoil, Jr. |
| 2,379,413 A | 7/1945 | Bradley |
| 2,450,940 A | 10/1948 | Cowan et al. |
| 2,662,068 A | 12/1953 | Floyd |
| 2,861,048 A | 11/1958 | Wright et al. |
| 3,141,787 A | 7/1964 | Goetze et al. ............ 106/252 |
| 3,148,125 A | 9/1964 | Strianse et al. ............ 167/85 |
| 3,156,572 A | 11/1964 | Carlick et al. ............. 106/27 |
| 3,341,465 A | 9/1967 | Kaufman et al. .......... 252/316 |
| 3,420,789 A | 1/1969 | Wilson |
| 3,595,816 A | 7/1971 | Barrett |
| 3,615,289 A | 10/1971 | Felton ......................... 44/7.5 |
| 3,645,705 A | 2/1972 | Miller et al. ................. 44/7.5 |
| 3,741,711 A | 6/1973 | Bryant ........................ 431/125 |
| 3,819,342 A | 6/1974 | Gunderman et al. ......... 44/7.5 |
| 4,051,159 A | 9/1977 | Tsoucalas et al. ........ 260/404.5 |
| 4,062,819 A | 12/1977 | Mains et al. .............. 260/18 N |
| 4,115,370 A | 9/1978 | Corrado ................. 260/22 CQ |
| 4,128,436 A | 12/1978 | O'Hara et al. ............. 106/243 |
| 4,150,002 A | 4/1979 | Drawert et al. |
| 4,259,183 A | 3/1981 | Cadotte ....................... 210/654 |
| 4,275,054 A | 6/1981 | Sebag et al. ................. 424/65 |
| 4,337,298 A | 6/1982 | Karim et al. ................ 428/461 |
| 4,341,671 A | 7/1982 | Bolze et al. ................. 528/324 |
| 4,346,024 A | 8/1982 | Coquard et al. ............ 524/219 |

| 4,369,284 A | 1/1983 | Chen ........................... 524/476 |
| 4,376,194 A | 3/1983 | Tanaka et al. ............... 528/288 |
| 4,427,366 A | 1/1984 | Moore ......................... 431/291 |
| 4,438,240 A | 3/1984 | Tanaka et al. ............... 525/420 |
| 4,449,987 A | 5/1984 | Lindauer ........................ 44/7.5 |
| 4,552,693 A | 11/1985 | Hussain et al. ......... 252/522 A |
| 4,568,270 A | 2/1986 | Marcus et al. .............. 431/288 |
| 4,571,267 A | 2/1986 | Drawert et al. ............... 106/27 |
| 4,663,428 A | 5/1987 | Okitu et al. ................. 528/324 |
| 4,742,128 A | 5/1988 | Frisch et al. ................ 525/424 |
| 4,742,147 A | 5/1988 | Nichols ........................ 528/75 |
| 4,760,117 A | 7/1988 | Evans et al. ................. 525/394 |
| 4,769,285 A | 9/1988 | Rasmussen ................. 428/355 |
| 4,816,549 A | 3/1989 | Rumack ...................... 528/336 |
| 4,826,428 A | 5/1989 | Lam ............................ 431/291 |
| 4,855,098 A | 8/1989 | Taylor ......................... 264/103 |
| 4,937,069 A | 6/1990 | Shin .............................. 424/66 |
| 4,937,701 A | 6/1990 | Schroder .................... 362/161 |
| 4,946,922 A | 8/1990 | Reisch et al. ................. 528/76 |

(List continued on next page.)

FOREIGN PATENT DOCUMENTS

| EP | 469 435 B1 | 1/1995 |
| EP | 467 533 B1 | 11/1997 |
| WO | WO 88/00603 | 1/1988 |
| WO | WO 97/08282 | 3/1997 |
| WO | WO 98/17243 | 4/1998 |
| WO | WO 98/17705 | 4/1998 |
| WO | WO 00/40216 | 7/2000 |
| WO | WO 00/46326 | 8/2000 |

OTHER PUBLICATIONS

Tóth et al., "Analytical Performances of Lipophilic Diamides Based Alkaline Earth Ion–Selective Electrodes," *Electoanalysis* 5(9–10):781–790, 1993.
Vedanayagam et al., "Kinetics of Reaction of $C_{36}$ Dimeric Fatty Acids and Ethylenediamine in Solution," *J. of Applied Polymer Science* 45(12):2245–2248, Aug. 25, 1992.
Yasuda et al., "Novel Low–Molecular–Weight Organic Gels: N,N',N''—Tristearyltrimesamide/Organic Solvent System," *Chemistry Letters*, pp. 575–576, 1996.

*Primary Examiner*—Fred Zitomer
(74) *Attorney, Agent, or Firm*—Seed Intellectual Property Law Group PLLC

(57) ABSTRACT

A tertiary amide-terminated dimer acid-based polyamide may be blended with a solvent to form a gel. The solvent may be flammable, and a wick may be added to the resulting gel so as to form a candle. Depending on the composition, the candle may be formed into a free-standing pillar, or may be better suited to being placed in a container. The solvent may, for example, be mineral oil or triglyceride. A solid coating may be placed around the candle, for advantages including to enhance the mechanical stability of the gelled body, and to eliminate the tendency of a gel to have an oily feel and to accept noticeable fingerprints. The solvent which, in combination with the tertiary amine-terminated dimer acid-based polymer forms a gel, may be or include a fragrance material. The gelled composition may also include fatty acid and/or a compound containing one, two, or more ester groups. In one aspect, the article does not contain a wick, and is intended to function as a fragrance-releasing product.

87 Claims, 3 Drawing Sheets

U.S. PATENT DOCUMENTS

| | | | |
|---|---|---|---|
| 5,069,897 A | 12/1991 | Orr | 424/66 |
| 5,102,656 A | 4/1992 | Kasat | 424/66 |
| 5,132,355 A | 7/1992 | Nahlovsky | 524/474 |
| 5,177,177 A | 1/1993 | Thullen et al. | 528/339.3 |
| 5,180,802 A | 1/1993 | Hartman et al. | 528/335 |
| 5,221,534 A | 6/1993 | DesLauriers et al. | 424/78.03 |
| 5,338,187 A | 8/1994 | Elharar | 431/288 |
| 5,342,894 A | 8/1994 | Robeson et al. | 525/183 |
| 5,364,924 A | 11/1994 | Gerkin et al. | 528/73 |
| 5,372,852 A | 12/1994 | Titterington et al. | 427/288 |
| 5,395,233 A | 3/1995 | Karp | 431/289 |
| 5,432,204 A | 7/1995 | Farkas | 521/49 |
| 5,500,209 A | 3/1996 | Ross et al. | 424/66 |
| 5,538,718 A | 7/1996 | Aul et al. | 424/64 |
| 5,578,089 A | 11/1996 | Elsamaloty | 44/275 |
| 5,597,300 A | 1/1997 | Wohl et al. | 431/288 |
| 5,603,925 A | 2/1997 | Ross et al. | 424/65 |
| 5,632,615 A | 5/1997 | DeGarmo | 431/288 |
| 5,645,632 A | 7/1997 | Pavlin | 106/31.29 |
| 5,693,277 A | 12/1997 | Widmer | 264/153 |
| 5,783,657 A | 7/1998 | Pavlin et al. | 528/310 |
| D411,891 S | 7/1999 | Bell et al. | D26/6 |
| 6,068,472 A | 5/2000 | Freeman et al. | 431/291 |
| 6,111,055 A | 8/2000 | Berger et al. | 528/310 |
| 6,129,771 A | 10/2000 | Ficke et al. | 44/275 |
| 6,214,063 B1 | 4/2001 | DeStefano et al. | 44/275 |
| 6,214,290 B1 | 4/2001 | Esposito | 422/1 |

GELLED ARTICLES CONTAINING TERTIARY AMIDE-TERMINATED POLYAMIDE

CROSS-REFERENCE TO RELATED APPLICATION

The present application is a continuation-in-part of U.S. application Ser. No. 09/871,238, abandoned filed May 30, 2001, which is a continuation-in-part of U.S. application Ser. No. 09/225,889 filed Jan. 4, 1999, now U.S. Pat. No. 6,268,466 granted Jul. 31,2001, which applications are incorporated herein by reference in their entireties.

BACKGROUND OF THE INVENTION

1. Field of the Invention

The invention relates to gelled articles, and in particular to articles that are flammable, such as a candle, and/or contain and emit an active ingredient, such as fragrance, where the article may include an exterior coating.

2. Description of the Related Art

A common type of candle that sees widespread use consists of a wick embedded in a block of paraffin wax, where the wax provides the fuel for the burning candle. Paraffin has many properties that make it suitable for use in a candle. Paraffin as used in candles is typically highly refined and, at room temperature, is in a crystalline state. Crystalline paraffin is naturally white, and white paraffin candles are commonplace. Colorants may be added to these paraffin-based candles, to thereby achieve essentially any desired coloration. Paraffin-based candles are also rigid, and can be formed into a free-standing pillar structure. Such pillar candles, whether white or colored, can be placed atop candlesticks and the like, and are a popular consumer item. Paraffin is an inexpensive raw material, which makes it an economically-attractive ingredient for a candle. Perhaps unappreciated by consumers is that paraffin is also a good material from which to prepare a candle because it meets the rather stringent burning requirements for a candle, as discussed in more detail herein.

Paraffin-based candles have a significant drawback, however. Paraffin-based candles are neither transparent nor translucent, and in fact are opaque. Candle manufacturers have recognized an unmet need for transparent candles, and particularly transparent candles which can adopt the pillar form, i.e., are rigid and self-supporting. Thus, the literature describes numerous attempts to prepare a satisfactory transparent pillar candle.

One approach has been to combine a thermoplastic polyamide resin with a solvent, where the polyamide resin is formed from dimer acid and acts as a gellant. Examples of this approach are found in, for example, U.S. Pat. Nos. 3,615,289; 3,645,705; 3,819,342 and 4,449,987. Candles made by this approach, which may be referred to as polyamide gel candles, have significant shortcomings which have limited their commercial acceptance. For example, such compositions are often not very transparent or even translucent, and may require the addition of a "clarifying agent" to achieve even a semi-transparent state (see, e.g., U.S. Pat. No. 3,819,342). In addition, such compositions are often not as hard as desired, and may require additives that increase stiffness and hardness in order to achieve even a short pillar form (see, e.g., U.S. Pat. No. 3,645,705), or are simply recommended for use in containers (see, e.g., U.S. Pat. No. 3,819,342).

Another significant problem with candles prepared with polyamide gellants is that they typically exhibit syneresis, where this term refers to the formation of liquid on the surface of a gel or colloidal suspension. In other words, droplets of solvent or other candle additive often form on the surfaces of a polyamide gel candle. Syneresis is a highly undesirable property in a candle because, among other reasons, 1) consumers don't want to touch a wet, oily candle; 2) the candle becomes more brittle, as oil escapes; and 3) the droplets of liquid solvent/additives tend to burn quite quickly once the candle is lit, giving the candle a torch-like quality.

Syneresis is particularly pronounced when the candle incorporates fragrance: he fragrance is frequently observed to exude from the candle and exacerbate the flaring problem (as discussed in, e.g., U.S. Pat. No. 3,615,289). Thus, for example, U.S. Pat. No. 3,645,805 suggests using only a small amount of fragrance in a polyamide gel candle, while U.S. 3,615,289 recommends up to about 2 percent fragrance.

Basically, the phenomena of syneresis and blooming reflect the fact that the components of a polyamide gel candle are not sufficiently compatible with one another to maintain a homogeneous state. The prior art has both recognized this problem and attempted to solve it by various means. Two such approaches are the judicious choice of solvent (see, e.g., U.S. Pat. No. 3,819,342), and/or including additives in the candle composition, such as "anti-flaring" compounds (see, e.g., U.S. Pat. No. 3,615,289). These approaches have not been very successful in providing a candle that is desired by the public.

There are several other problems associated with the gel candles prepared with prior art polyamide gellants. One such problem is the failure of the candle to have and/or retain a completely colorless clear appearance. More specifically, it is observed that these gel candles will typically develop an undesirable yellow hue over time and/or with burning. Another problem is that when a colorant has been added to a polyamide gel candle, the initial color of the candle can fade, possibly due to a reaction between the organic components of the candle and the colorant. Also, polyamide gel candles are often observed to form an irreversibly crosslinked structure, which is undesirable because once the molten composition is poured into the form of a candle, it cannot be remelted and repoured in instances where the original candle contained a structural defect. In general, gel candles made with polyamides of the prior art have serious shortcomings, and have not received wide commercial acceptance.

Accordingly, research has been directed to developing non-polyamide gelling agents. Two such examples are the ester-terminated polyamide resins described in U.S. Pat. Nos. 5,783,657 and 5,998,570, and their incorporation into products including candles as described in U.S. Pat. No. 6,111,055. A second approach is to use block copolymers. See, e.g., U.S. Pat. No. 5,578,089 and PCT International Application No. PCT/US96/13993.

The present invention provides another approach to preparing gel-based candles, where the present invention is based on the very surprising discovery that a properly prepared polyamide resin may be used as a suitable gellant for low polarity liquids. These and other related advantages of the present invention are disclosed below.

SUMMARY OF THE INVENTION

In one aspect, the present invention provides a candle, where the candle includes a wick and a gel phase. The gel phase includes a gellant and a liquid that is gelled by the gellant. The gellant includes a tertiary amide-terminated polyamide (ATPA) resin of the formula (1):

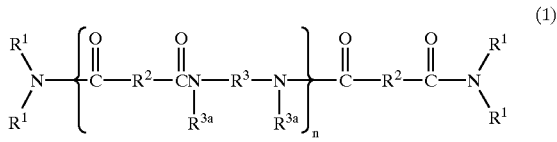

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

In various aspects of the candle: terminal amide groups of the formula $C(=O)N(R^1)(R^1)$ constitute from 20% to 35% of the total of the amide groups; and/or n is an integer from 1 to 5; and/or $R^2$ is a $C_{30-42}$ hydrocarbon group having the structure of polymerized fatty acid with the carboxylic acid groups removed; and/or between 1% and 50% of the $R^2$ groups are a $C_{4-19}$ hydrocarbon group; and/or $R^3$ is a $C_{2-36}$ hydrocarbon group and $R^{3a}$ is hydrogen; and/or at least 1% of the —$N(R^{3a})$—$N^3$—$N(R^{3a})$-groups are independently selected from polyalkylene amine,

and

wherein $R_c$ is a $C_{1-3}$alkyl group; and/or the candle further contains diamide having formula (1) wherein n=0, such that the ratio of terminal amide groups to the total of the amide groups in the resin is from 0.1 to 0.7; and/or the liquid being gelled by the ATPA includes mineral oil; and/or the liquid being gelled by the ATPA includes fatty acid ester; and/or the candle also contains wax.

In a preferred embodiment of the ATPA-containing candle of the present invention, the resin constitutes 5–40, preferably 10–40 weight percent of the gel phase, mineral oil constitutes 20–60 weight percent of the gel phase, and fatty acid ester constitutes 10–40 weight percent of the gel phase. In another preferred embodiment of the ATPA-containing candle of the present invention, the resin constitutes 20–30 weight percent of the gel phase, mineral oil constitutes 30–50 weight percent of the gel phase, and fatty acid ester constitutes 20–30 weight percent of the gel phase. As the amount of resin is decreased, the resulting gel tends to be less firm.

In further aspects, the candle may further contain a fragrance and/or at least one icon; and/or a second, visually distinct phase, where this second phase may be formed of solvent and a gellant for the solvent, or it may contain wax.

In another aspect, the present invention provides a candle that contains a wick and a gel phase. The gel phase contains a gellant and a liquid that is gelled by the gellant. The gellant is prepared by a method that includes reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0.

In optional aspects, at least about 50% of the carboxylic acid equivalents are from polymerized fatty acid, $0.9 \leq \{x/(y+z)\} \leq 1.1$, and $0.1 \leq \{z/(y+z)\} \leq 0.7$; or optionnally all equivalents of carboxylic acid come from polymerized fatty acid; optionally the diamine has the formula $H_2N$—$R^3$—$NH_2$ and $R^3$ is a $C_{2-36}$ hydrocarbon group; optionally at least 50% of the amine equivalents are contributed by a diamine of the formula $H_2N$—$R^3$—$NH_2$ wherein $R^3$ is a $C_{2-36}$ hydrocarbon group, and at least 1% of the amine equivalents are contributed by one or more diamines selected from

and $H_2N$—$R^3$—$NH_2$, wherein $R^3$ is selected from polyalkylene oxide, polyalkylene amine, and the formula

wherein $R_c$ is a $C_{1-3}$ alkyl group; optionally the secondary amine-containing molecule has the formula $R^1$—NH—$R^1$, and $R^1$ is independently at each occurrence a $C_{12-22}$ hydrocarbon group; optionally the liquid includes mineral oil; optionally the liquid includes fatty acid ester; optionally the candle also includes wax; optionally the resin constitutes 5–40, preferably 10–40 weight percent of the gel phase, mineral oil constitutes 20–60 weight percent of the gel phase, and fatty acid ester constitutes 10–40 weight percent of the gel phase; optionally the resin constitutes 20–30 weight percent of the gel phase, mineral oil constitutes 30–50 weight percent of the gel phase, and fatty acid ester constitutes 20–30 weight percent of the gel phase; optionally the candle also includes fragrance; optionally the candle includes at least one icon; optionally the candle includes a second, visually distinct phase, where the second phase may include solvent and a gellant for the solvent, or the second phase may include wax.

In another aspect the present invention provides a candle comprising a wick and a gel phase, the gel phase comprising a gellant and a liquid that is gelled by the gellant, the liquid comprising triglyceride, the gellant comprising a tertiary amide-terminated polyamide resin of the formula (1):

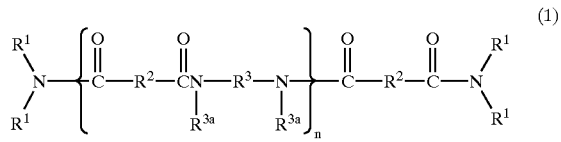

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

In another aspect, the present invention provides a candle comprising a wick and a gel phase, the gel phase comprising a gellant and a liquid that is gelled by the gellant, the liquid comprising triglyceride, the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the gellant, and wherein each of x, y and z is greater than 0.

In another aspect, the present invention provides a method for preparing a candle. The method includes combining a low polarity liquid with ATPA of formula (1) as described above, to provide a gel or pre-gel, and combining the gel or pre-gel with a wick. The pre-gel is a molten form of the gel, that upon cooling forms a gel. The method may further include placing the candle into a container. Optionally, the method may include placing a solid coating on at least a portion of the surface of the candle. The candle may also be prepared by combining a low polarity liquid with the resin prepared by the process as outlined above.

In one aspect, the present invention provides an article that includes a wick, flammable solvent with a flash point ranging from about −15° C. to about 300° C. and tertiary amide-terminated polyamide (ATPA) of formula (1)

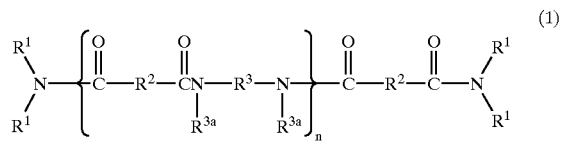
(1)

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. In one aspect, the flash point ranges from about 40° C. to about 90° C. In another aspect, a coating overlies at least a portion of the article's surface.

In another aspect, the present invention provides a fragrance-releasing composition, the composition includes a gel phase where the gel phase includes a fragrance, a gellant, and a liquid that is gelled by the gellant. The gellant includes a tertiary amide-terminated polyamide resin of the formula (1):

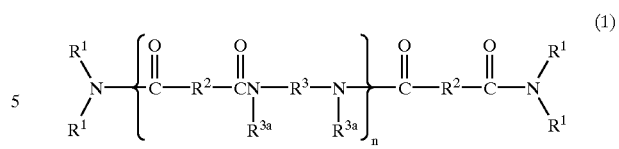
(1)

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. In one aspect of the invention, the liquid that is gelled by the gellant is the same as the fragrance, i.e., the gellant is able to gel the fragrance so that no other liquid is necessarily present in order to form the gel.

In another aspect, the present invention provides a fragrance-releasing composition that includes a gel phase, where the gel phase includes a fragrance material, a gellant, and a liquid that is gelled by the gellant, and where the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0. In one aspect of the invention, the liquid that is gelled by the gellant is the same as the fragrance, i.e., the gellant is able to gel the fragrance so that no other liquid is necessarily present in order to form the gel.

In another aspect, the present invention provides an article of manufacture comprising a tertiary amide-terminated polyamide resin of the formula (1):

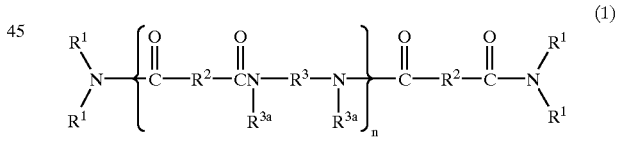
(1)

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. In a preferred embodiment, this article of manufacture comprises triglyceride.

In another aspect, the present invention provides an article of manufacture comprising a tertiary amide-terminated polyamide resin, the resin prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0. In a preferred embodiment, this article of manufacture includes triglyceride.

These and related aspects of the invention are described further below.

DETAILED DESCRIPTION OF THE INVENTION

Figure 1:
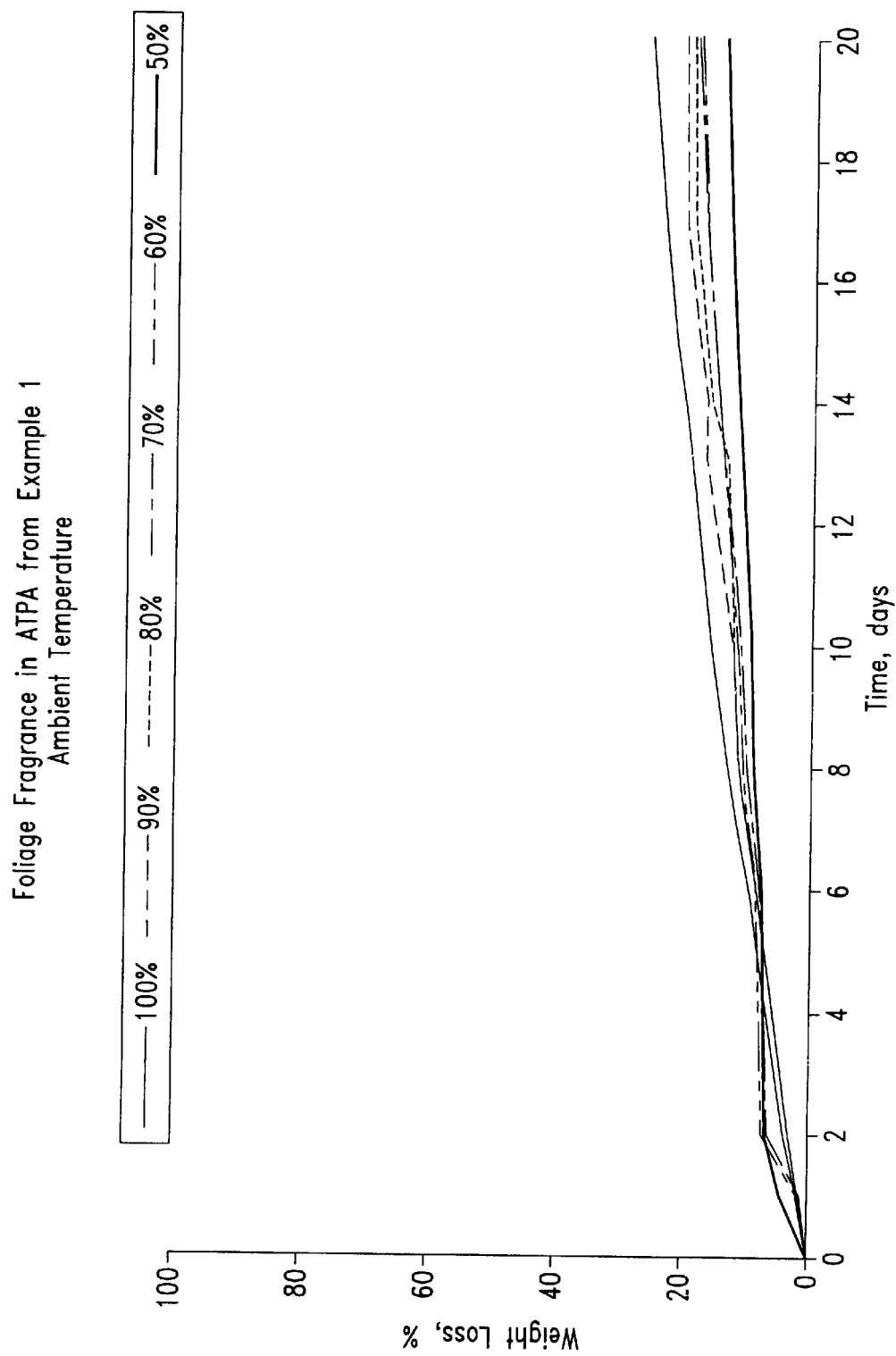
FIGS. 1, 2 and 3 show in graphical form some fragrance release data obtained from gels prepared by gelling fragrance chemicals with ATPA resin according to the present invention.

In one aspect, the present invention provides a candle prepared from a resin composition that includes short-chain polyamide of the formula (1), which will be referred to herein as tertiary amide-terminated polyamides, or ATPA.

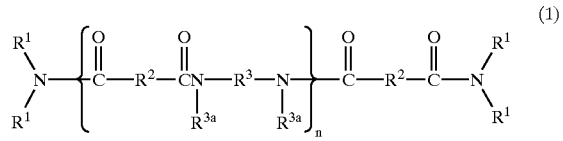

(1)

In formula (1), n designates a number of repeating units such that terminal (i.e., $R^1$-containing) amide groups constitute from 10% to 50% of the total of the amide groups shown in formula (1); $R^1$ at each occurrence is independently selected from a $C_{1-22}$ hydrocarbon group; $R^2$ at each occurrence is independently selected from a $C_{2-42}$ hydrocarbon group with the proviso that at least 50% of the $R^2$ groups have 30–42 carbon atoms; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$, such that at least 50% of the $R^{3a}$ groups are hydrogen.

In one aspect, the resin composition further comprises diamide having formula (1) wherein n=0, such that the ratio of terminal amide groups to the sum of amide groups in the total of the molecules that comprise the resin of formula (1) is from 0.1 to 0.7. Preferably, the resin composition is at reaction equilibrium.

As may be seen from formula (1), the ATPA resins have terminal amide groups of the formula —C(=O)N($R^1$)($R^1$) at both ends of a series of amide groups. These terminal amide groups are formed from secondary amines (since $R^1$ is an organic group and is not hydrogen), and therefore the terminal amide groups in formula (1) are properly referred to as tertiary amide groups. Accordingly, the ATPA resins may be referred to as tertiary amide-terminated polyamides.

The letter "in" in formula (1) designates the number of repeating units present in a molecule of ATPA, and is an integer greater than 0. According to the invention, n may be 1, in which case the ATPA contains equal numbers of terminal amide and non-terminal amide groups, i.e., the terminal amide groups constitute 50% of the total of the amide groups in the ATPA molecule. The preferred ATPA resins are of relatively low molecular weight, so that n is preferably 1 to about 10, and more preferably is 1 to about 5. Because the ATPA molecules have such a low molecular weight, they could equally well be referred to as tertiary amide-terminated oligoamides. In any event, viewed another way, the terminal amide groups constitute about 10% to about 50%, preferably about 15% to about 40%, and more preferably about 20% to about 35% of the total of the amide groups. A preferred ATPA resin includes a mixture of ATPA molecules of formula (1) having various n values. The ATPA resin has a weight average molecular weight of less than about 10,000, and typically less than about 5,000, but more than 500, typically more than 1,000, when measured by gel permeation chromatography using polystyrene calibration standards.

The $R^1$ group in formula (1) is a hydrocarbon group, and preferably is an alkyl or alkenyl group which contains at least 1, typically at least 4, and preferably more than 4 carbon atoms, e.g., 8, 10, 12, 14, 16, 18, 20, or 22 carbon atoms. Alkyl groups are preferred, however alkenyl groups having 1–3, and preferably 1 site of unsaturation are also suitable. The upper range for the number of carbon atoms in the $R^1$ group is not particularly critical, however preferably the $R^1$ group has less than or equal to about 22 carbon atoms. $R^1$ groups having about 16–22 carbon atoms are highly preferred. The identity of $R^1$ at any occurrence is independent of the identity of $R^1$ at any other occurrence.

Suitable $R^1$ groups are readily introduced into a molecule of formula (1) when secondary monoamine(s) is used as a co-reactant in preparing the ATPA resin. The secondary monoamine has the formula $HN(R^1)(R^1)$, wherein $R^1$ is defined above. Suitable secondary monoamines are commercially available from a variety of sources, including Witco Corporation (Greenwich, Conn.; www.witco.com); Akzo Nobel Chemicals, Surface Chemistry (Chicago, Ill.; www.akzonobelusa.com); and Aldrich (Milwaukee, Wis.; www.aldrich.sial.com). Di(hydrogenated tallow) amine (e.g., ADOGEN™ 240SF from Witco Corporation) is a preferred secondary monoamine.

The $R^2$ group in formula (1) is suitably a hydrocarbon containing 2 to 42 carbon atoms, and preferably contains 4 to 42 carbon atoms. A more preferred $R^2$ group contains 30–42 carbon atoms (i.e., is a $C_{30\text{-}42}$ group), and at least 50% of the $R^2$ groups in an ATPA resin preferably have 30–42 carbon atoms. Such $R^2$ groups are readily introduced into an ATPA when the resin is prepared from polymerized fatty acid, also known as dimer acid. Polymerized fatty acid is typically a mixture of structures, where individual dimer acids may be saturated, unsaturated, cyclic, acyclic, etc. Thus, a detailed characterization of the structure of the $R^2$ groups is not readily available. However, good discussions of fatty acid polymerization may be found in, for example, U.S. Pat. No. 3,157,681 and Naval Stores—Production, Chemistry and Utilization, D. F. Zinkel and J. Russel (eds.), Pulp. Chem. Assoc. Inc., 1989, Chapter 23. Dimer acid is available commercially as, for example, UNIDYME™ and SYLVADYM™ dimer acids from Arizona Chemical (Jacksonville, Fla.), EMPOL™ dimer acid from Henkel Corporation, Emery Oleochemicals Division (Cincinnati, Ohio); and PRIPOL™ dimer acid from Unichema North America (Chicago, Ill.).

Typically, upon the polymerization of fatty acid, both dimer acid and trimer acid are produced. This polymerization product may be subjected to distillation in order to fractionate the dimer and trimer acids. However, it is difficult and rather expensive to fractionate polymerized fatty acids to such an extent that it contains no trimer acid. Accordingly, "dimer acid" as is commercially available often contains some trimer acid, and the specification sheet for the dimer acid will typically list a trimer acid content. The "dimer acid" that may be utilized to prepare ATPA resins of the present invention may contain some trimer acid. Preferably, the dimer acid contains less than about 20 wt % trimer acid, and in one aspect of the invention the dimer acid contains less that 20 wt %, or less than 15 wt %, or less than 10 wt %, or less than 5 wt % trimer acid (the remainder being $C_{36}$ dimer acid). The ratio of dimer acid and trimer acid present in a polymerized fatty acid distillate can be determined by gas chromatography, according to methods well known in the art.

While the preferred ATPA resins contain at least 50% $C_{30\text{-}42}$ groups as the $R^2$ group, more preferably the total of the $R^2$ groups consist of at least 75% $C_{30\text{-}42}$ groups, and still more preferably consist of at least 90% $C_{30\text{-}42}$ groups. ATPA resins of formula (1) wherein $R^2$ is entirely $C_{30\text{-}42}$ are preferred gelling agents of the invention.

However, ATPA resins may also contain $R^2$ groups having less than 30 carbon atoms. For example, an ATPA resin may contain one or more $R^2$ groups having about 4 to 19, preferably about 4 to 12, and more preferably about 4 to 8 carbon atoms. The carbon atoms may be arranged in a linear, branched or cyclic fashion, and unsaturation may be present between any two carbon atoms. Thus, $R^2$ may be aliphatic or aromatic. When present, these lower carbon-number $R^2$ groups are preferably formed entirely of carbon and hydrogen, i.e., are hydrocarbyl groups. Such lower carbon-number $R^2$ groups preferably constitute less than 50% of the $R^2$ groups; however, when present, constitute about 1% to about 50%, and preferably about 5% to about 35% of the total of the $R^2$ groups. The identity of $R^2$ at each occurrence is independent of the identity of $R^2$ at any other occurrence. Suitable co-diacids are available from, for example, Aldrich (Milwaukee, Wis.).

The $-N(R^{3a})-N^3-N(R^{3a})-$ group in formula (1) links two carbonyl (C=O) groups. In a preferred embodiment of the invention, all of the $R^{3a}$ groups in an ATPA resin are hydrogen, so that $R^3$ alone joins the two nitrogen atoms shown in the formula $-N(R^{3a})-N^3-N(R^{3a})-$. In this case, the $R^3$ group contains at least two carbon atoms, and optionally oxygen and/or nitrogen atoms, in addition to any hydrogen atoms that are necessary to complete otherwise unfilled valencies of the carbon, oxygen and nitrogen atoms. In one embodiment, $R^3$ is a hydrocarbon group, having 2 to about 36 carbon atoms, preferably having 2 to about 12 carbon atoms, and more preferably having 2 to about 8 carbon atoms. These carbon atoms may be arranged in a linear, branched or cyclic fashion, and unsaturation may be present between any two of the carbon atoms. Thus, $R^3$ may contain aliphatic or aromatic structures. The identities of $R^3$ and $R^{3a}$ at each occurrence are independent of their identities at any other occurrence.

The $R^3$ groups may contain oxygen and/or nitrogen in addition to carbon and hydrogen atoms. A typical oxygen atom-containing $R^3$ group is a polyalkylene oxide, i. e., a group having alternating alkylene groups and oxygen atoms. Indeed, the oxygenation in a $R^3$ group is preferably present as an ether group. Representative polyalkylene oxides include, without limitation, polyethylene oxide, polypropylene oxide and copolymers (either random, alternating or block) of ethylene oxide and propylene oxide. Such oxygenated $R^3$ groups are readily introduced into an ATPA resin through use of JEFFAMINE™ diamines (Huntsman Chemical, Inc., Houston, Tex.). These materials are available in a wide range of molecular weights, where any molecular weight diamine may be used in the preparation of the resins of the invention. While some of the $R^3$ groups may contain oxygen (at least about 1%), preferably a minor number (less than 50%) of the $R^3$ groups contain oxygen, and more preferably less than about 20% of the $R^3$ groups contain oxygen. The presence of oxygen-containing $R^3$ groups tends to lower the softening point of the ATPA resin.

When present, the nitrogen atoms in an $R^3$ group are preferably present as secondary or tertiary amines. A typical nitrogen-containing $R^3$ group having secondary amine groups is a polyalkylene amine, i.e., a group containing alternating alkylene groups and amine groups, which is sometimes referred to as a polyalkylene polyamine. The alkylene group is preferably a lower alkylene group, e.g., methylene, ethylene, (i.e., $-CH_2CH_2-$), propylene, etc. A typical polyalkylene amine may be represented by the formula $-NH-(CH_2CH_2NH)_m CH_2CH_2-NH-$ wherein m is an integer from 1 to about 5.

However, the nitrogen atoms in the nitrogen-containing $R^3$ group may alternatively (or additionally) be present as tertiary nitrogen atoms, e.g., they may be present in a heterocycle of the formula:

wherein $R_c$ is a $C_{1\text{-}3}$ alkylene group. In the above-described nitrogen-containing $R^3$ groups, $R^{3a}$ was hydrogen. However, $R^{3a}$ is not limited to hydrogen. In fact, $R^{3a}$ may be a $C_{1\text{-}10}$alkyl group, preferably a $C_{1\text{-}5}$alkyl group, and more preferably a $C_{1\text{-}3}$alkyl group. In addition, $R^3$ and $R^{3a}$, or two $R^{3a}$ groups, may together form a heterocyclic structure, e.g., a piperazine structure such as

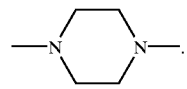

In this case, the two $R^{3a}$ groups may be seen as joining together to form an ethylene bridge between the two nitrogen atoms, while $R^3$ is also an ethylene bridge. Additional suitable diamines are available from, for example, Aldrich (Milwaukee, Wis.).

The ATPA resin typically includes a mixture of ATPA molecules of formula (1) in addition to, for example, by-products that are formed during the ATPA-forming reaction. While the ATPA molecules of formula (1) may be purified from such by-products using, for example, chromatography or distillation, the by-products are typically either minimal in amount or impart desirable properties to the resin when the resin functions as a gelling agent, and thus need not be separated from the molecules of formula (1) in order for a suitable ATPA resin to be formed.

As described herein, amines and carboxylic acids are preferred starting materials to form the ATPA resins of the invention. These starting materials are preferably reacted together with a stoichiometry, and under reaction conditions, such that the acid number of the resulting ATPA resin is less than 25, preferably less than 15, and more preferably less than 10, while the amine number is preferably less than 10, more preferably less than 5, and still more preferably less than 1. The softening point of the ATPA resin is preferably greater than room temperature, more preferably is about 50° C. to about 150° C., and still more preferably is about 80° C. to about 130° C.

It is important to control the stoichiometry of the reactants in order to prepare an ATPA resin according to the invention. In the following discussion regarding reactant stoichiometry, the terms "equivalent(s)" and "equivalent percent" will be used, and are intended to have their standard meanings as employed in the art. However, for additional clarity, it is noted that equivalents refer to the number of reactive groups present in a molar quantity of a molecule, such that a mole of a dicarboxylic acid (e.g., sebacic acid) has two equivalents of carboxylic acid, while a mole of monoamine has one equivalent of amine. Furthermore, it is emphasized that in preparing an ATPA resin, the diacid has only two reactive groups (both carboxylic acids), the monoamine has only one reactive group (a secondary amine group) and the diamine has only two reactive groups (preferably both primary amines), and these are preferably, although not necessarily, the only reactive materials present in the reaction mixture.

When co-diacid is employed to prepare an ATPA resin, the co-diacid preferably contributes no more than about 50% of the equivalents of carboxylic acid present in the reaction mixture. Stated another way, the co-diacid contributes from 0–50 equivalent percent of the acid equivalents in the reaction mixture. Preferably, the co-diacid contributes 0–30 equivalent percent, and more preferably contributes 0–10 equivalent percent of the acid equivalents in the reaction mixture.

The stoichiometry of the reactants will have a significant impact on the composition of the ATPA resin. For example, ATPA resins made with increasing amounts of secondary monoamine will tend to have lower (number and weight) average molecular weights. In other words, as more monofunctional reactant is used, the number of amide pairs in an average molecule of formula (1) will decrease. On the other hand, as less monoamine is used, the average molecular weight of the molecules in the ATPA resin will increase. In general, increasing the average molecular weight of the ATPA will tend to increase the melting point and melt viscosity of the resin. When a high melting point ATPA is combined with a solvent to thereby form a gel, the gel will tend to have a firmer consistency than does a gel formed from an ATPA with a low melting point.

In another aspect of the invention, the ATPA gellant is the product prepared by a method that includes reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0. In a preferred aspect, at least about 50% of the carboxylic acid equivalents are from polymerized fatty acid, $0.9 \leq \{x/(y+z)\} \leq 1.1$, and $0.1 \leq \{z/(y+z)\} \leq 0.7$.

In order to prepare an ATPA resin, the above-described reactants (diacid, monoamine and diamine, or reactive equivalents thereof) may be combined in any order. Preferably, the reactants are simply mixed together and heated for a time and at a temperature sufficient to achieve essentially complete reaction, to thereby form the ATPA resin. During formation of the ATPA resin, the diacid and diamine groups will alternate to form what may be termed an alternating copolymer. The ATPA is not a block copolymer. The terms "complete reaction" and "reaction equilibrium" as used herein have essentially the same meaning, which is that further heating of the product gelling agent does not result n any appreciable change in the acid or amine numbers of the resin.

Thus, the ATPA resin may be formed in a one-step procedure, wherein all of he diacid (including co-diacid), secondary monoamine, and diamine are combined and hen heated to about 180–250° C. for a few hours, typically 2–8 hours. When lower temperatures are used, a longer reaction time is typically needed to achieve complete reaction. When the reaction temperature is too high, the reactants and/or products may undergo undesirable thermally-induced decomposition. Since one or more of the reactants may be a solid at room temperature, it may be convenient to combine each of the ingredients at a slightly elevated temperature, and then form a homogeneous mixture prior to heating the reaction mixture to a temperature sufficient to cause reaction between the diacid, monoamine and diamine. Alternatively, although less preferably, two of the reactants may be combined and reacted together, and then the third reactant is added followed by further heating until the desired product is obtained. Reaction progress may be conveniently monitored by periodically measuring the acid and/or amine number of the product mixture.

As one example, dimer acid may be reacted with diamine so as to form polyamide, and then this intermediate polyamide may be reacted with monoamine to form a tertiary amide-terminated dimer acid-based polyamide. Or, dimer acid may be reacted with the monoamine to thereby form diamide, and this diamide may be reacted with diamine to thereby form tertiary amide-terminated dimer acid-based polyamide. Because the components of the ATPA resin are preferably in reaction equilibrium (due to transamidation), the order in which the reactants are combined typically does not impact on the properties of the gelling agent.

Any catalyst that may accelerate amide formation between carboxylic acid and amine groups may be present in the reaction mixture described above. Thus, mineral acid such as phosphoric acid, or tin salts such as dibutyltin oxide, may be present during the reaction. In addition, it is preferred to remove water from the reaction mixture as it is formed upon amide formation. This is preferably accomplished by maintaining a vacuum n the reacting mixture, or by passing a gentle stream of an inert gas (e.g., nitrogen) across he top of the reaction mixture.

The ATPA resins of the invention, in combination with a solvent or solvent system, may be formulated to function as a candle or other article which will be intentionally burned, in which case the solvent is preferably flammable. A suitable "other article" is an icon that may be placed into a candle so as to provide a pleasing aesthetic effect, as well as fuel for the candle. In general, the solvent is preferably non-aqueous, in that it does not contain any appreciable amount of water. As used herein, the term solvent for use in preparing candles or icons, includes any substance which is a liquid at a temperature between 10–60° C., and which forms a gel upon being combined with an ATPA resin, and which is flammable.

A flammable solvent for preparing gels of the invention typically has a flash point ranging from about −15° C. to about 300° C., and preferably from about −15° C. to about 225° C. When the flammable ATPA-containing article is primarily intended to be a fuel source, i.e., is intended to be used to assist the lighting of a fire in a fireplace, a campfire, a charcoal fire, etc., then the flash point of the solvent preferably ranges from about −15° C. (e.g., hexane) to about 225° C. (e.g., heavy mineral oil). A preferred flash point is between about 40° C. and about 90° C. When the article is primarily intended to be a candle, i.e., primarily for decorative purposes and home use, then the flash point of the solvent should be about 130° C. to about 225° C., and is preferably about 150° C. to about 200° C. Candles, more than fuel sources, are intended for slow burning and may be left unobserved for periods of time. For these reasons, a higher flash point is generally preferred for a candle compared to a fuel source, so that the candle burns more slowly and safely. In addition to effecting flash point, variations in mineral oil molecular weight and viscosity will also impact levels of fragrance release, gel structure, and propensity toward syneresis.

Methods to measure flash point are well known. For example, ASTM D-92 and D-93 provide procedures for determining the flash point of a solvent. The current address for ASTM is 100 Barr Harbor Drive, West Conshohocken Pa. 19428–2959. ASTM D92–90 (i.e., test D92, last revised in 1990) as set forth in the Annual Book of ASTM Standards, Section 5 (pages 28–32 in 1996 edition), is directed to a test method for measuring flash and fire points by the so-called Cleveland Open Cup method. The Cleveland Open Cup method is particularly suited for measuring the flash points of viscous materials having a flash point of 79° C. and above, i.e., liquids with relatively high flash points such as mineral oils. ASTM D93–94 as set forth in the Annual Book of ASTM Standards, Section 5 (pages 33–46 in 1996 edition), is directed to a test method for measuring flashpoint by the Pensky-Martens Closed Cup Tester. The Pensky-Martens Closed Cup Tester may be used with fuel oils, lubricating oils, and other homogeneous liquids. VWR Scientific Products, having a website at http://www.vwrrsp.com, presently sells a Pensky-Martens Flash Point Tester, Electric Boekel; a Pensky-Martens Flash Point Tester, Precision; and a Tag Closed Cup Flash Tester, Koehler, any of which may be used to determine flash points according to the present invention.

While flash point may be measured by the above-listed techniques, in addition, many reference books and catalogs provide flash point information about solvents and fuels. For example, the Aldrich Chemical Company (Milwaukee, Wis.) offers a catalog of over a thousand chemicals, and in this catalog the flash points of many of the available chemicals is set forth. The Material Data Safety Sheet (MSDS) that is often available from a chemical manufacturer, typically provides flash point information about the chemical.

The combination of ATPA resin and solvent has a gel-like consistency. In general, materials that have a gel-like character will maintain their shape when undisturbed but flow upon being rubbed. Gels prepared with ATPA may be anywhere from soft to hard, where a "hard" gel has a rigid structure and is very resistant to deformation, while a "soft" gel exhibits some, but not too much, resistance to deformation. An illustration of "soft" gel may be seen in the preparation of Jell-O® dessert, which is a well-known food product from Kraft Foods Inc. (division of Philip Morris Companies Inc., Northfield, Ill.). When prepared according to the package instructions, Jell-O® dessert is mixed with water to form a relatively soft gel.

The solvent may be a liquid or solid at room temperature, but is preferably a liquid. Examples of solvents that are solid at room temperature include fatty acids such as myristic acid (FP>159° C.) and fatty alcohols such as myristyl alcohol (FP>143° C.). A preferred solvent has a low polarity, where exemplary low polarity solvents include hydrocarbons and organic esters. The solvent may include minor amounts of co-solvents, such as a high flash point alcohol (e.g., propylene glycol, FP=137° C.).

A preferred solvent is a hydrocarbon, where the hydrocarbon may be aliphatic or aromatic. A preferred hydrocarbon solvent is an oil, where mineral oil is a preferred oil. Mineral oils useful in the invention include, but are not limited to, transformer oil, spindle oil, cable insulating oil and machine oil. In one embodiment, the mineral oil is food grade mineral oil. Examples of suitable, commercially available mineral oils include SONNEBORN™ and CARNATION™ white oils from Witco Corp. (Greenwich, Conn.); ISOPAR™ K and ISOPAR™ H from Exxon Corp. (Houston, Tex.); and DRAKEOL™ and PENETECKυ white mineral oils from Penreco (Kams City, Pa.).

Other hydrocarbon solvents that may be used in the invention include relatively lower molecular weight hydrocarbons including linear saturated hydrocarbons such a tetradecane, hexadecane, octadecane, etc. Cyclic hydrocarbons such as decahydronaphthalene (DECALIN™), fuel grade hydrocarbons, branched chain hydrocarbons such as PERMETHYL™ from Permethyl Corp. and ISOPAR™ from Exxon Corp. (Houston, Tex.); and hydrocarbon mixtures such as product PD-23™ from Witco Corp. (Greenwich, Conn.) may also be used in preparing gels of the invention. Such hydrocarbons, particularly saturated hydrocarbon oils, are a preferred solvent for preparing a gel of the invention. Aromatic hydrocarbons, e.g., toluene or xylene, may also function as the solvent in a gel of the invention. A surprising advantage of the ATPA-containing gels of the present invention is that ATPA is particularly compatible with high molecular weight hydrocarbon oils, e.g., DRAKEOL™ 34 oil.

Another class of suitable solvents is esters. An ester will include the structural formula —C(=O)—O—, and preferably includes the structural formula —C(=O)—O—$R^5$ where $R^5$ is selected from $C_1$–$C_{22}$ hydrocarbyl groups. As used herein, a hydrocarbyl group is formed exclusively from carbon and hydrogen. Such esters may be monofunctional esters (i e., have a single ester moiety) or may be polyfunctional (i.e., have more than one ester group). Suitable esters include, but are not limited to, the reaction products of $C_{1-24}$ monoalcohols with $C_{1-22}$ monocarboxylic acids, where the carbon atoms may be arranged in a linear, branched and/or cyclic fashion, and unsaturation may optionally be present between carbon atoms. Preferably, the ester has at least about 18 carbon atoms. Examples include, but are not limited to, fatty acid esters such as isopropyl isostearate, n-propyl myristate, isopropyl myristate, n-propyl palmitate, isopropyl palmitate, hexacosanyl palmitate, octacosanyl palmitate, triacontanyl palmitate, dotriacontanyl palmitate, tetratriacontanyl palmitate, hexacosanyl stearate, octacosanyl stearate, and triacontanyl stearate. Other suitable esters include glycerol and propylene glycol esters of fatty acids, such as the so-called polyglycerol fatty acid esters.

One preferred type of ester is a triester, and specifically a triglyceride. A triglyceride is a particularly preferred type of ester because it is a "green" material, that is, a naturally-occurring biodegradable material. Consumers increasingly ask for environmentally-friendly products, and by providing for the gelation of a triglyceride in the formation of a candle or fragrance release agent, the present invention meets this request.

A triglyceride molecule is a molecule of fat or oil, composed of three fatty acid moieties esterified to a glycerol backbone structure. In other words, a triglyceride molecule is formed when 3 independently-selected fatty acid molecules react at their carboxylic acid (i.e., —C(=O)—OH)

functional sites, with the 3 hydroxylic functional groups of a glycerol molecule, producing a single triglyceride molecule. Thus, a triglyceride molecule has the following general structure:

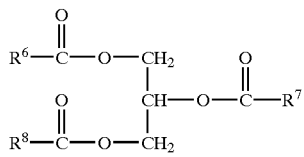
(2)

wherein $R^6$, $R^7$, and $R^8$ are independently selected from hydrocarbon groups comprising at least one carbon atom with its associated hydrogen atoms and optionally comprising hydroxyl groups.

The triglyceride may be a vegetable or animal oil, where the oil may be, for example, selected from rapeseed, sesame, soya, soybean, safflower, coco, palm, sunflower, canola (low erucic rapeseed) oil, cottonseed, olive, palm kernel, linseed, castor, peanut, corn, and fish. Other exemplary sources for vegetable oil include, without limitation, crambe, meadow foam, lesquerella, grapeseed, hemp seed, jojoba, tung oil, flaxseed, camelina, and marine algal oils. Exemplary animal oils include, without limitation, lard, poultry grease, and fish oil, where suitable fish oils include, without limitation, menhaden, sardine, and herring oils.

The triglyceride may contain one, two or three saturated fatty acids, where exemplary saturated fatty acids are valeric, caproic, caprylic, lauric, myristic, palmitic, stearic, arachidic, behenic, lignoceric, cerotic, and montanic acids. The triglyceride may contain one, two or three unsaturated fatty acids, where exemplary unsaturated fatty acids are caproleic, palmitoleic, oleic, vaccenic, eladic, brassidic, erucic, and nervonic acids. The triglyceride may contain one, two or three polyunsaturated fatty acids, where exemplary polyunsaturated fatty acids are linoleic, linolenic, eleostearic, and arachidonic acids. In one aspect of the invention the triglyceride is selected from corn oil, olive oil, peanut oil and CRISCO™ vegetable shortening.

In the triglyceride, any of $R^6$, $R^7$ or $R^8$ may be a hydroxyl-substituted hydrocarbon. In one aspect, the hydrocarbon is substituted with a single hydroxyl group. Suitable fatty acids having hydroxyl-substituted hydrocarbon groups include fatty acids derived from castor oil, e.g., ricinoleic acid and hydroxystearic acids. Castor oil itself may be a triglyceride that may be gelled according to the present invention.

Rapeseed oil may be used in the invention, where rapeseed oil is formed primarily from $C_{22}$ fatty acid. $C_{16}$–$C_{18}$ fatty acids are typically incorporated into tallow, soybean oil or cottonseed oil, where these triglyceride oils may be gelled according to the present invention. Coconut, palm kernel and babassu oils are primarily formed from shorter-chain fatty acids. Castor oil, corn oil, lard, linseed oil, olive oil, palm oil, peanut oil, safflower seed oil, sesame oil, sunflower seed oil, tall oil, tallow, and (menhaden) fish oil are examples of other natural oils which can be gelled according to the present invention. The fat or oil may, or may not, be hydrogenated prior to being gelled according to the present invention.

Preferably, the solvent is a low-polarity liquid as described above, and more preferably the solvent is a liquid hydrocarbon. The liquid may contain more than one component, e.g., hydrocarbon as well as ester-containing material. In one aspect, the invention provides a mixture wherein the gellant (ATPA) contributes 5–95%, preferably 10–95%, and the solvent contributes 5–95%, preferably 5–90% of the combined weight of the gellant and the solvent. Preferably, the gellant is combined with the solvent such that the weight percent of gellant in the gellant+solvent mixture is about 5–50%, and preferably is about 10–45%. In one aspect, the present invention provides a candle or fragrance release article wherein the gellant resin constitutes 10–60 weight percent of the gel phase, and triglyceride constitutes 20–70 weight percent of the gel phase. Such gels may be transparent, translucent or opaque, depending on the precise identities of the gellant and solvent, as well as the concentration of gellant in the mixture.

In one aspect, the present invention provides candles prepared from the gellants described herein, where the candles are made from 20–90% ATPA, 10–80% mineral oil, 0–30% Arizona SP-100™, and 0–20% fragrance, each percentage value being a weight percentage based on the total weight of the listed components. For a free-standing pillar candle, a preferred formulation uses 30–70% ATPA, 30–70% mineral oil, and 0–10% fragrance, again on a weight percent basis. For a container candle, a preferred formulation uses 20–45% ATPA, 55–80% mineral oil, and 0–10% fragrance, also on a weight percentage basis. Colorants and dyes compatible with mineral oil can be used to tint the transparent candle formulation. Fragrances compatible with mineral oil can be used to scent the formulation. Both color and dye are useful enhancements but not necessary for the performance of the candles of the invention.

Quite desirably, both container and free-standing pillar candles of the invention exhibit little or no syneresis in high humidity conditions, upon standing at ambient temperature and humidity for extended periods of time, nor upon freezing and thawing. In addition, candles of the invention exhibit excellent resistance to internal cracking, or separation of the solid phase, upon exposure to freezing and thawing, upon standing at ambient temperature and humidity for extended periods of time, and upon exposure to high humidity.

In order to prepare a gel from a solvent and ATPA resin, the two components are mixed together and heated until homogeneous. A temperature within the range of about 80–150° C. is typically sufficient to allow the ATPA to completely dissolve in the solvent. A lower temperature may be used if a solution can be prepared at the lower temperature. Upon cooling, the mixture forms the gelled composition of the invention. Optional components may be added to the molten composition, and are dispersed and/or dissolved to provide a homogeneous composition prior to cooling of the molten composition. A surprising advantage of the ATPA-containing candles of the present invention is that they are often particularly resistant to cracking and separation at low temperatures. This property enables improved worry-free shipping and storage of the ATPA-containing candles.

In one embodiment of the invention, the ATPA resin in combination with one or more solvents forms a rigid gel. As used herein, the term "rigidity" refers to the amount of deflection that a gel displays when responding to a force. More specifically, rigidity may be measured by holding a cylinder (or similar shape) of gel material in a horizontal direction. The extent to which the cylinder bends toward the earth under the force of gravity is used as a measure of the rigidity of the gel. A very rigid gel will not bend to any noticeable degree, while a gel that exhibits little or no rigidity will display considerable bend.

In another embodiment, the ATPA gels of the present invention may be formulated such that they are transparent.

There are various degrees of transparency, ranging from crystal clear to hazy, which may be achieved with gels of the invention. In order to provide some measure of the absolute transparency of a gel, the following test has been devised. A white light is shined through a gel sample of a given thickness at room temperature, and the diffuse transmittance and the total transmittance of the light are determined. The percent haze for a sample is determined by the equation: % haze=(diffuse transmittance/total transmittance)×100. Samples are prepared by melting the gel (or product made therefrom) and pouring the melt into 50 mm diameter molds. The samples may be prepared at two thicknesses, e.g., 5.5±0.4 mm and 2.3±0.2 mm.

Clarity measurements are made on a Hunter Lab Ultrascan Sphere Spectrocolorimeter using the following settings: specular included, UV off, large area of view, illuminate D65, and observer 10°. Using this protocol with a 2.3 mm thickness sample, an ATPA gel of the present invention may have a % haze value of less than 75, while paraffin wax has a % haze value of over 90. The % haze value for a gel of the present invention can be increased if desired, by appropriate selection of solvent and gellant. Thus, the present invention provides gels (and articles made therefrom) having a transparency (measured by % haze) of less than 75, preferably less than 50, more preferably less than 25, still more preferably less than 10, and yet still more preferably of 5 or less.

In one embodiment, the ATPA gels of the invention are also stable, in that they do not display syneresis. As defined in the McGraw-Hill Dictionary of Scientific and Technical Terms (3rd Edition), syneresis is the spontaneous separation of a liquid from a gel or colloidal suspension due to contraction of the gel. Typically, syneresis is observed as the separation of liquid from a gel, and is sometimes referred to as "bleeding", in that wetness is seen along the surfaces of a gel that displays syneresis. From a commercial point of view, syneresis is typically an undesirable property, and the gels of the present invention desirably, and surprisingly exhibit little or no syneresis. In one embodiment, the candles of the present invention are stable in the sense that they do not exhibit syneresis. That is, they do not have an oily feeling when handled.

To prepare a candle of a particular desired shape, a mold may be used, where the molten ATPA/solvent/etc. mixture is poured into, and allowed to cool in, a mold. A gel formed from ATPA may adhere to the sides of the container in which the gel is formed. During cooling, the molten homogeneous mixture will undergo some contraction, which may be impeded if the gel sticks to the sidewalls of the container. In these instances, cracks may form in the cooling gel, because the contracting gel is adhering to the container. When a crack-free candle or other article is desired, such a product may be prepared by allowing the gel to cool to just above its gel point, and then pouring the cooled gel into a mold. In this way, the degree of cooling, and hence contraction, that occurs within the mold is minimized, with concomitant reduction in cracking.

If desired, the molten mixture may be poured into a mold or a jar, and the mixture cooled therein to form the candle or fuel. The mold may be used when the gel desirably has an ornamental exterior surface. For example, the mold may impart various designs, in a relief fashion, to the surface of the gel. In one aspect, the design is a ridged pattern, with the ridges preferably extending vertically (from top to bottom) along the sides of the candle. These ridges are desirable because they minimize the surface area that is contacted when a person picks up the candle, and therefore there is less opportunity for smudges and fingerprints to be imparted to the surface of the candle. Thus, in one aspect, the invention provides free-standing candles, i.e., candles that are not contained within a container.

Molds to achieve various relief surfaces are commonly used in the preparation of paraffin-based candles, and are well known in the art. A pillar shape, which is a common and desired form for candles, is a preferred shape for the gel. Cubes and cylinders are other suitable shapes for the gel. An appropriate quantity of mold-release agent may be placed on the interior mold surface, in order to facilitate removal of the gel from the mold. Such mold-release agents may contain silicon or fluorocarbon, are available from many commercial sources, and are known in the art.

Alternatively, the molten mixture may be poured into a jar or like container, to permanently hold the gel. Thus, in one aspect, the present invention provides a "container candle", i.e., a candle permanently held within a container. The jar may be formed of clear or colored glass, and have essentially any shape, according to the aesthetic preferences of the manufacturer. Alternatively, the jar may be formed of any other non-flammable substance, e.g., metal. A noteworthy feature of the ATPA-containing gels of the invention is their transparent and colorless appearance, and thus containers which allow the consumer to appreciate this appearance, e.g., clear glass or mirrored surface jars, are preferred. However, when the gel will be used primarily as a fuel source during, for example, camping, the container is preferably robust and not easily broken. For these instances, the container is preferably metal, e.g., aluminum or the like.

Regardless of whether the molten mixture is cooled in a mold or a jar, various decorative items may be placed within the mixture to enhance the appearance thereof. These decorative items are commonly referred to as icons. Icons include so-called botanicals, which manufacturers currently place just below the surface of a paraffin candle, in order that the shadow of a leaf or otherwise shaped article can be seen on the candle's surface. Because the candles of the present invention may be transparent, such botanicals may be placed anywhere within the candle, to provide for a pleasing appearance. As another example, colored paraffin beads, or otherwise shaped items, may be added to the molten mixture at an appropriate time during its cooling, so that the decorative items are suspended in the gel. As yet another example, colorant may be gently stirred into the otherwise clear, cooling molten mixture, so that coloration in a swirling pattern may be seen in the final gel.

Colorants, dyes, and pigments can be used in formulation of 20–90% ATPA, 10–80% mineral oil, 0–20% fragrance, and 0–5% colorant, dye, or pigment (where these are weight percent values based on the total weight of the formulation) to form either clear or opaque decorative objects (icons) suitable for incorporation into the candles of the invention. Such decorative objects (icons) have the advantage of superb compatibility with the bulk candle formula which minimizes visible interfaces in the transparent candle. In addition, icons prepared from ATPA need not be separated from the burn pool of the candle and can be consumed in the same manner as the bulk candle formulation by burning the candle. To form the icon, ATPA may be gelled into a pleasing shape, and that shape combined with or juxtaposed with an ATPA-containing candle. For instance, color-tinted ATPA-based gelled cubes may be mixed with a colorless ATPA-based gel, so that when the combination cools to room temperature the observer sees a clear matrix with suspended tinted cubes. When a wick is present in this mixture, an effective and aesthetically pleasing candle results.

The botanicals, beads or other icons should be added to the cooling molten mixture at a time when the viscosity of the molten mixture is such that the decorative items will not simply sink to the bottom of the mold or jar, unless that is the desired appearance. This time will depend on the exact identity of the decorative items, and can be readily determined by the skilled artisan without undue experimentation.

In order to minimize colorant moving from the icon to the bulk phase of the handle, a transparent barrier coating may be placed around the icon. Such a coating is particularly desirable when the icon is a gelled material, e.g., an ATPA gel or an ETPA gel (see, e.g., U.S. Pat. Nos. 5,783,657 and 5,998,570 for a description of ETPA gels). Suitable barrier coatings are polymeric coatings, including thermoplastic polymer and thermoset polymer. A suitable thermoplastic polymer is selected from polyamide resin, ester-terminated dimer acid-based polyamide resin and styrene-acrylic resin, as disclosed in U.S. Pat. No. 6,111,055. The coating may be applied by any of, for example, (a) spraying the coating onto the exterior surface; (b) dipping the gel structure into a solvent-containing coating composition; or (c) dipping the gel structure into a solvent-free molten coating composition.

When a wick is positioned in a flammable gel as described herein, a candle is formed. Such a candle has a surface that is preferably free of bubbles, cracks, chips, etc., when seen by the unaided eye. The candle may be transparent, translucent or opaque, and may be colorless, white or any other color, if dyes or pigments are added to the formulation. The candle preferably contains a single wick, where the wick is preferably positioned in the center of the candle. Alternatively, the candle may have a plurality of wicks. Upon burning, the candle preferably displays a bright, calm flame, and gradually forms a pool surrounding the wick and abutting the so-called cup rim.

Candle wicks are commercially available, and the precise wick should be selected, in part, based on the size of the candle. A preferred wick is made from uniform, tear-resistant cotton yarn made of medium- and long-stapled cotton which is seasoned and does not have moisture damage. A typical wick has from 15–42 strands (plys). A larger wick (more strands) is preferred for a larger candle. In one aspect of the invention, a transparent wick is used, so that the entire candle (wick plus fuel, and coating if present) may be transparent. The wick should be free of contaminants that impair a suction effect needed for desirable burning. The wick should not leave ashes upon burning, and it should burn without visible release of soot. A preferred wick has an upright posture upon exiting the candle, with a slight curvature and formation of a glow point at the wick tip upon burning. The wick in a preferred candle has a medium curvature while the candle burns, and the flame bums without visible release of soot. There is preferably a slight afterglow formed immediately after the candle has been extinguished.

The wick may be embedded with wax or other additive that facilitates or provides desired burning properties. For example, the wick may be colored using a water or alcohol soluble dye. Examples of water and alcohol soluble dyes that may be used to color the wick include, without limitation, F,D&C Blue #1, D&C Orange #4, Ext D&C Violet #2, F,D&C Red #4, D&C Red #33, F,D&C Red #40, D&C Green #8, D&C Yellow #10, F,D&C Yellow #5 and D&C Green #5.

When preparing a candle from ATPA, other optional ingredients such as colorant, fragrance, insect repellent, insecticide, and/or preservative (for example, antioxidant and/or UV-inhibitors), may be added at any time prior to formation of the gel structure. For example, they may be added after the gellant and solvent have formed a homogeneous mixture. Alternatively, they may be added prior to the formation of a homogeneous mixture.

The preservative, which may be an antioxidant and/or a UV-inhibitor, should be present in an amount effective to achieve its or their desired purposes. Typically, at least about 0.1 wt % of one or both of an antioxidant and UV inhibitor will be present in an article of the invention. Suitable antioxidants and UV-inhibitors are well known in the art, and include, without limitation, dihydroxytoluene, stearic hydrazide, 2,6-di-tert-butyl-4-methylphenol (BHT, an antioxidant), Irganox® g 1010 hindered phenol antioxidant from Ciba-Geigy (Hawthorne, N.Y.) and Uvinul® 3206 UV-inhibitor from BASF, Parsippany, N.J.

The colorant may, for example, be a pigment or a dye, however a dye is preferred for providing colored transparent articles. Dyes that are oil soluble are particularly well suited. Oil soluble dyes are well known in the art, and may be obtained from, for example, Pylam Products, Tempe Arizona. Pylam Products sells the following oil soluble dyes: D&C violet #2, D&C yellow #11, D&C green #6, D&C red #17, Pylakromem Red, Pylakrome™ brilliant blue, Pyla-Wax™ brilliant blue, Pyla-Wax™ canary yellow, Pyla-Wax™ violet A, and Pyla-Wax™ brilliant red, among others.

The amount of dye that should be present in the gel will depend on the intensity of the dye and the desired strength of the coloration of the gel. This amount can be readily determined by the skilled artisan, with little or no experimentation. Typically, a colorant amount of less than 1 wt % (based on the total weight of the gel) is satisfactory, and often an amount of less than 0.5 wt % or less than 0.25 wt % is satisfactory. The colorant may be mixed together with the solvent and gellant at any time prior to, or during, formation of the gel.

Another optional ingredient is a fragrance. The term "fragrance" is intended to refer to a chemical or blend of chemicals that together have a desirable odor. Fragrances, therefore, typically consist of a blend of chemicals, fragrant chemicals or fragrance materials. A large number of fragrance materials are known and used in various products such as perfumes, cosmetics, soaps, detergents, etc. Any of the fragrance materials used in these products may be added to a gel of the present invention. International Flavors & Fragrance (IFF, New York N.Y.) sells a large number of suitable fragrance raw materials. U.S. Pat. No. 6,111,055 lists a number of suitable fragrances, formerly available from Bush Boake Allen, now available from IFF.

The amount of fragrance that should be present in the gel will depend on the intensity of the fragrance and the degree to which it is desired that the gel emit fragrance. This amount can be readily determined by the skilled artisan, with little or no experimentation. An amount of fragrance equal to at least about 0.1 wt %, based on the total weight of the composition, is typically necessary in order to achieve at least some fragrance-emitting character for the composition. Typically, a fragrance amount of less than 50 wt % (based on the total weight of the gelled body) is satisfactory, and often an amount of less than 20 wt % or even less than 15 wt % is satisfactory. In a typical gel having fragrance, the fragrance constitutes 1–5 wt % of the total weight of the gel.

The fragrance may be mixed together with the solvent and gellant at any time prior to formation of the gel. However since many fragrance materials are rather volatile, it is preferred to add the fragrance to the pre-gelled composition at a relatively low temperature rather than a higher temperature. A temperature of about 80° C. is typically suitable for adding the fragrance to the pre-gel.

Another optional ingredient is fatty acid. Fatty acid may be included in a formulation for a candle or a fragrance-releasing article of manufacture, where it may function to enhance the clarity of the article, or it may function merely to reduce the cost of the formulation. Such fatty acids generally have the formula R—COOH, where R is a hydrocarbon or may be a hydroxyl-substituted hydrocarbon. In one aspect, R is a $C_{10}$–$C_{25}$ hydrocarbon. Exemplary fatty acids are natural fatty acids obtained from plants or animals, and may be, for example, the hydrolysis product of a naturally occurring triglyceride. While the fatty acid is preferably derived from renewable vegetable sources, the fatty acid may also be a synthetic product, or a produced from petroleum feedstocks. Suitable fatty acids include, without limitation: saturated fatty acids, e.g., valeric, caproic, caprylic, lauric, myristic, palmitic, stearic, arachidic, behenic, lignoceric, cerotic, and montanic acids; unsaturated fatty acids, e.g., caproleic, palmitoleic, oleic, vaccenic, eladic, brassidic, erucic, and nervonic acids; and polyunsaturated fatty acids, e.g., linoleic, linolenic, eleostearic, and arachidonic acids. In one aspect, the fatty acid is myristic acid. In another aspect the fatty acid is oleic acid. In one aspect, the article of manufacture includes at least 1 wt %, and not more than about 70 wt % of fatty acid. In various aspects, the article of manufacture includes 1–60 wt % fatty acid, or 1–50 wt % fatty acid, or 1–40 wt % fatty acid, or 1–30 wt % fatty acid, or 1–20 wt % fatty acid. In another aspect the article includes 5–15 wt % of fatty acid, where these weight percent values are based on the total weight of the gellant, solvent, and optional components.

Another optional ingredient is an ester-containing compound, more simply referred to herein as ester, which is the partial or complete esterification product of a poly-alcohol with a monoacid or the esterification product of a poly-acid with a monoalcohol. For instance, the fatty acid ester may be the reaction product of a monohydric compound, a dihydric compound, a trihydric compound, a tetrahydric compound, a pentahydric compound, or a hexahydric compound, etc., each with a mono-carboxylic acid (i.e., a compound having a single carboxylic acid group). Or, the fatty acid ester may be the reaction product of a monocarboxylic acid compound, a dicarboxylic acid compound, a tricarboxylic acid compound, etc., each with a monohydric compound. A partial esterification product refers to a product wherein not all of the available hydroxyl groups of a polyhydric compound are esterified with a carboxylic acid, or not all of the available carboxylic acid groups of a polycarboxylic acid compound are esterified with a monohydric compound. A complete esterification product has no unesterified hydroxyl groups remaining from the polyhydric reactant, or no unesterified carboxylic acid groups remaining from the polycarboxylic acid reactant. Preferably, if the esterification product is an incomplete esterification product, the incomplete esterification product does not contain unreacted carboxylic acid groups.

The monocarboxylic acid component of the ester may be, for example, and in preferred embodiments is, any of the fatty acids listed above, e.g., saturated fatty acids, e.g., valeric, caproic, caprylic, lauric, myristic, palmitic, stearic, arachidic, behenic, lignoceric, cerotic, and montanic acids; unsaturated fatty acids, e.g., caproleic, palmitoleic, oleic, vaccenic, eladic, brassidic, erucic, and nervonic acids; and polyunsaturated fatty acids, e.g., linoleic, linolenic, eleostearic, and arachidonic acids. The monocarboxylic acid compound is esterified with a mono- or poly-hydric compound. Suitable monohydric compounds are alcohols having 5–15 carbons. Suitable polyhydric compounds are, for example, pentaerythritol and sugars, e.g., sorbitol.

The monohydric compound component of the ester may be, for example, and in preferred embodiments is, any of the following exemplary alcohols: pentanol, hexanol, 2-ethylhexanol, heptanol, octanol, nonanol, decanol, dodecanol, palmityl alcohol, stearyl alcohol, myristyl alcohol, behenyl alcohol, etc. The monohydric compound component is, in one aspect, a $C_5$–$C_{25}$ monohydric compound, and is preferably a hydrocarbon having only hydroxyl substitution. The monohydric compound may be esterified with mono- or poly-carboxylic acid compound. Suitable monocarboxylic acid compounds are saturated fatty acids, e.g., valeric, caproic, caprylic, lauric, myristic, palmitic, stearic, arachidic, behenic, lignoceric, cerotic, and montanic acids; unsaturated fatty acids, e.g., caproleic, palmitoleic, oleic, vaccenic, eladic, brassidic, erucic, and nervonic acids; and polyunsaturated fatty acids, e.g, linoleic, linolenic, eleostearic, and arachidonic acids. In one aspect, the dicarboxylic acid compounds are of the formula HOOC—$R^2$—COOH where $R^2$ is straight chain $C_2$–$C_6$ hydrocarbon, e.g., adipic acid.

Thus, in one aspect of the invention, the ester is dicarpyl adipate. In another aspect of the invention the ester is sorbitan monooleate. In one aspect, the article of manufacture includes at least 0.1 wt %, and not more than about 40 wt % of ester as described above, and in other aspects the ester contributes 0.1–30 wt %, or 0.1–25 wt %, or 0.1–20 wt %, or 0.1–15 wt %, or 0.1–10 wt % of the entire composition, where these weight percent values are based on the total weight of the gellant, solvent, and optional components.

Indeed, even without a wick, the combination of ATPA gellant, a solvent to form a gel with the ATPA, and a fragrance is a very desirable combination for a fragrance-release agent. Using ATPA, transparent or opaque gel can be formed from 5–95%, preferably 10–95% ATPA and 5–95%, preferably 5–90% fragrance. These gels provide a convenient method of fragrance delivery for air freshener, perfume stick, etc. The transparency of the gel is dependent upon the particular fragrance chosen, where oil-soluble fragrances tend to form clearer gels. An oil soluble fragrance is soluble, or miscible with a hydrocarbon oil, e.g., mineral oil, at a concentration of about 50 wt %.

Thus, in one aspect, the present invention provides a fragrance-releasing composition comprising a gel phase, where the gel phase comprises a fragrance, a gellant, and a liquid that is gelled by the gellant, the gellant comprising a tertiary amide-terminated polyamide resin of the formula (1):

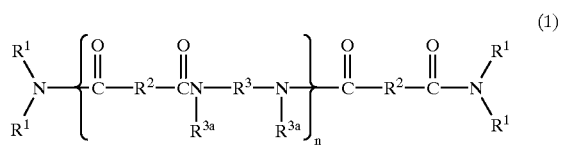

(1)

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^3a$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. In addition, the present invention provides a fragrance-releasing composition comprising a gel phase, where the gel phase comprises a fragrance material, a gellant, and a liquid that is gelled by the gellant, the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0.

In the two fragrance-releasing compositions described above, the composition contains both a fragrance material and a solvent. However, if the fragrance material is sufficiently hydrocarbon soluble, it can be directly gelled with the ATPA resin without the necessary incorporation of any "solvent" where solvents typically do not have any appreciable or desirable odor. Thus, in another aspect, the present invention provides a fragrance-releasing composition comprising a gel phase, where the gel phase comprises a fragrance and a gellant but does not necessarily comprise a solvent, where the fragrance is gelled by the gellant, and the gellant comprises a tertiary amide-terminated polyamide resin of the formula (1):

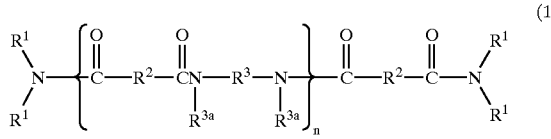

(1)

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. In another aspect, the gellant is prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0.

Another optional ingredient in either the candle or the fragrance release composition is an insect repellent. Suitable insect repellents include, without limitation, citronella, DEET, terpineol, and benzalacetone. In a typical gel, the insect repellent constitutes about 0.1–20 wt %, preferably 5–10 wt % of the total weight of the gel. When a candle contains insect repellent, the preferred gellant concentration is 30–60 wt % when the candle is in pillar form and 20–30 wt % when the candle is non-pillar (ie., placed within a jar or the like). In preparing a candle that contains insect repellent, ATPA is a preferred gellant.

The ATPA-containing gels as described above, whether intended as a candle or simply a fragrance release medium, may be encased in whole or part by a solid coating. As used herein, the term encased means "covered by", so that an article at least partially encased by a coating has a coating overlying at least some of the gel. The coating preferably directly contacts the exterior surface(s) of the gel. The coating may confer one or more of a number of possible benefits to the gel.

For instance, any oily feel that may be sensed upon handling the ATPA-containing gel is eliminated when a dry coating is placed on the gel. The coating typically has a non-oily feel, and in fact typically feels dry to the touch. A gel absent the coating often tends to pick up fingerprints when it is handled. The coating does not so readily receive fingerprints, and thus in one aspect the invention provides that the ATPA-containing candle, even absent a container, may be repeatedly handled by a consumer without leaving telltale fingerprints, so long as the gel contains a coating as described above.

In addition, the coating typically imparts some mechanical strength to the article, which would not be present in its absence. Gels are often somewhat soft, and may benefit from the increased mechanical strength during, for example, shipping and storage of the article.

The coating may also enhance the clarity of the gelled body by imparting a rigid yet very smooth surface to the body. The coating may be made to be extremely smooth and to have a highly polished appearance. Even when the underlying gel itself is transparent, the surface of the gel may not be completely smooth, in part due to a degree of softness that is typically present in a gel. However, when a hard transparent coating is placed on the surface of a gel, then a very smooth and flawless exterior surface can be achieved. This smooth surface imparts a greater appearance of clarity to the gel. The transparent coating may also improve the refractive index of the exterior of the gel.

The coating is preferably clear and colorless or essentially colorless. In addition, the coating is solid, preferably not brittle, and yet not so soft that it is easily deformed after application to the gelled body. The coating may contain optional ingredients, such as fragrance, UV-inhibitors, antioxidants, insect-repellents, and the like.

In a preferred embodiment, the coating includes thermoplastic polymer. A preferred thermoplastic polymer is a polyamide resin formed from dimer acid and diamine, and possibly optional components. The dimer acid-containing (or "based") resins are commercially available from many sources, including Arizona Chemical under the UNIREZ trademark, and Henkel Corporation under the MAC-ROMELT trademark. They are essentially the reaction product of polymerized fatty acid as described above, and diamine. Optional reactants include monoamine, diacid other than polymerized fatty acid, refined trimer acid, monocarboxylic acid, and others known in the art. Because these polyamides have been sold commercially for about 50 years, and are well known in the art, the following description of dimer acid-based polyamides is abbreviated. These and other suitable coating compositions have been described in the context of other gel-based articles, see, e.g., U.S. Pat. No. 6,111,055, where the coating compositions disclosed in this patent are equally useful in coating gelled articles made from ATPA according to the present invention.

The coating can be placed on the ATPA-containing gelled body by various techniques. For example, the coating composition may be solid at room temperature but liquid at elevated temperature. In this case, the coating composition may be taken to a molten state and then the gelled body dipped briefly therein, to thereby adhere a layer of coating onto the surface of the body. When the coating composition is soluble in a solvent, then a solution of the coating composition may be prepared and the solution applied to the surface of the gelled body by, e.g., spraying or brushing at, e.g., room temperature. Alternatively, the gelled body may be dipped into the coating composition solution. Alcohols, such as normal alcohols (e.g., n-propanol and n-butanol) or branched alcohols (e.g., isopropanol) are typically suitable solvents for forming solutions of thermoplastic polymers. When the coating composition is applied in the absence of a solvent, it will be referred to as a neat coating composition or a solvent-free coating composition. Suitable techniques to apply these and other coating compositions have been described in the context of other gel-based articles. See, e.g., U.S. Pat. No. 6,111,055.

The flammable articles of the present invention may or may not include a solid coating. In some respects, the presence of a solid coating is desirable because it adds to the mechanical strength of the article, where enhanced mechanical strength is desirable during shipping and storage of the flammable article. In addition, the solid coating essentially eliminates any oily feeling and fingerprinting on the candle, and effectively reduces syneresis because the coating effectively holds in any oils that may tend to leach out of the gelled body due to syneresis. The solid coating may additionally contain one or more of fragrance, insect-repellent, UV-inhibitor and anti-oxidant. Also, the solid coating may contain a pattern, e.g., a relief image, which adds to the aesthetic appeal of the coated article.

Thus, the present invention provides articles of manufacture that include or are made from an ATPA resin. In one aspect, the ATPA resin has the formula (1):

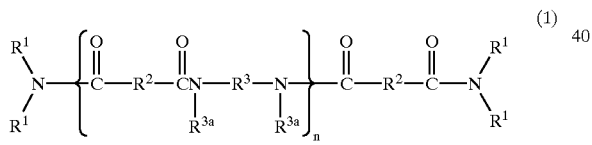

(1)

wherein, n designates a number of repeating units such that terminal amide groups constitute from 10% to 50% of the total amide groups; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$. In another aspect, the ATPA resin is prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0. The article of manufacture may be a candle, or other flammable article. The article may be a fragrance release material, e.g., a perfume stick. The following examples are set forth as a means of illustrating the present invention and are not to be construed as a limitation thereon. In the synthesis Examples that follow, and unless otherwise noted, the chemicals were all of reagent grade, obtained from commercial supply houses including Aldrich Chemical Co. (Milwaukee, Wis.) and the like. EMPOL® 1008 polymerized fatty acid is a dimer acid available from Henkel Corporation (Ambler, Pa.) ADOGEN™ 240SF is di(hydrogenated tallow)amine available from Witco Corporation (Greenwich, Conn.; http://www.witco.com). PRIPOL™ 1006 is a dimer acid available from Unichema North America (Chicago, Ill.). ANOX™ 20 is a sterically hindered phenolic antioxidant available from Great Lakes Chemical Corporation (West Lafayette, Ind.).

EXAMPLES

Example 1

ATPA Gellant for Container Candle

Using the reactants and amounts shown in Table 1, dimer fatty acid and monoamine were combined and heated to 130° C. Diamine was added and heating continued to 200° C. The mixture was maintained at 200° C. until acid number was less than 17. The reaction mixture was cooled to 150° C. and then discharged from the reactor. The resulting resin had a color of 312 (APHA), softening point of 93° C., and an acid number of 15.7.

TABLE 1

| Reactant | % Equivalents | Weight % |
|---|---|---|
| EMPOL ™ 1008 | 100 | 67 |
| ADOGEN ™ 240SF | 24 | 28 |
| Ethylenediamine | 76 | 5 |

Example 2

Container Candles using ATPA Gellant

A candle was prepared using the ATPA resin prepared in Example 1. This candle was prepared by combining the materials set forth in Table 2 at 110° C. with stirring. The molten homogeneous combination was poured into a suitable container incorporating a wick, and allowed to cool to room temperature. The result was a transparent, lightly tinted gel with a hard, waxy texture.

TABLE 2*

| Component | Weight % |
|---|---|
| ATPA resin of Example 1 | 24 |
| Mineral Oil | 43 |
| Fatty acid ester | 23 |
| Myristic acid | 5 |
| Fragrance | 5 |

*Mineral oils used include DRAKEOL ™ 7, PAROL ™ 70HP (both from Penreco), and CARNATION ™ White Mineral oil (Witco). Fatty acid esters include Bis(1-Methylheptyl)ester (such as Arizona SP-100 ™, Arizona Chemical), and caprylic/capric triglyceride (such as NEOBEE ™ M5, Stepan).

The gel exhibited no syneresis after 7 days exposure to 100% relative humidity at 100° F. At −20° C. the resin became cloudy and remained cloudy upon warming to room temperature. No syneresis was observed upon warming.

Lighting the wick to burn the candle, either with or without previous exposure to high humidity or cold temperature, gave a flame of normal height and width. The flame characteristics are directly dependent upon the wick selection.

Example 3

Container Candles using ATPA Gellant

A candle was prepared using the ATPA resin prepared in Example 1. This candle was prepared by combining the materials set forth in Table 3 at 110° C. with stirring. The molten homogeneous combination was poured into a suitable container incorporating a wick, and allowed to cool to room temperature. The result was a transparent, lightly tinted gel with a hard, waxy texture.

TABLE 3*

| Component | Weight % |
|---|---|
| ATPA resin of Example 1 | 24 |
| Mineral Oil | 42 |
| Fatty acid ester | 23 |
| Myristic acid | 5 |
| 2-Methyl-2,4-pentanediol | 2 |
| Fragrance | 4 |

*See Table 2 for specific commercially available mineral oils and fatty acid esters.

The resulting candle was transparent with a hard, waxy texture. It exhibited no syneresis after 7 days exposure to 100% relative humidity at 100° F. At −20° C. the resin became cloudy but turned clear upon warming to room temperature. No syneresis was observed upon warming. Lighting the wick to burn the candle, either with or without previous exposure to high humidity or cold temperature, gave a flame of normal height and width.

Example 4

Freestanding (Pillar) Candle using ATPA Gellant

A pillar candle was prepared by combining the components set forth in Table 4 (except for fragrance) and heating these components to 100–110° C until they all melted. After mixing thoroughly, the molten blend was cooled to 90° C. and the fragrance was added with mixing. The mixture was then poured into an appropriate mold incorporating a wick. After sufficient cooling, the candle was removed from the mold. Use of mold release agents can be beneficial depending on the material of construction of the mold and the mold geometry. Also, although a dye was not used in this instance, an oil soluble dye may be added to the components to provide some coloration/tint to the gel.

TABLE 4*

| Component | Weight % |
|---|---|
| ATPA resin of Example 1 | 48 |
| Mineral Oil | 37 |
| Fatty acid ester | 10 |
| 2-Methyl-2,4-pentanediol | 3 |
| Fragrance | 2 |

*See Table 2 for specific commercially available mineral oils and fatty acid esters.

The resulting candle was transparent and had a hard, waxy texture. Flame height and width were similar to common pillar candles and are directly affected by wick selection. A cylindrical candle 3 inches tall by 3 inches in diameter with a 44–24–18 cotton wick (available from Atkins & Pearce, Covington, Ky.; www.braid.net) burned 34 hours before the flame reached the wick tab at the bottom of the candle.

Example 5

Freestanding (Pillar) Candle using ATPA Gellant

Following the procedure of Example 4, a pillar candle was prepared using the components set forth in Table 5.

TABLE 5*

| Component | Weight % |
|---|---|
| ATPA resin of Example 1 | 41 |
| Mineral Oil | 37 |
| Fatty acid ester | 19 |
| Fragrance | 3 |

*See Table 2 for specific commercially available mineral oils and fatty acid esters.

The resulting candle was transparent with a waxy texture. The burn characteristics were identical to those described for the candle of Example 4.

Example 6

Tertiary Amide-Terminated Polyamides (ATPA)

Several ATPA's (labeled ATPA A, B, and C) were made from the reactants, and relative amounts thereof, as set forth in Table 6. In Table 6, "DTA" is an abbreviation for di(hydrogenated tallow) amine, "EDA" is an abbreviation for ethylene diamine, and PD-23™ is a petroleum distillate, all available from Witco Corporation (Greenwich, Conn.; www.witco.com). Selected properties for the ATPAs are also set forth in Table 6, including acid number, amine number, softening point ("S.P.") and the appearance when combined at 20 wt % solids in PD-23™ petroleum distillate ("Appearance").

In preparing ATPAs, a 60/40 EDA/DTA equivalent ratio results in a material (ATPA A) that forms a clear, hard gel in PD 23 distillate (at 20% solids). Increasing this ratio to 75/25 (see ATPA B) and 80/20 (see ATPA C) decreases the ATPA's solubility in PD-23™ petroleum distillate, resulting in opaque, hard gels.

TABLE 6

| ATPA | Composition (eq. %) | Acid No. | Amine No. | S.P. (° C.) | Appearance |
|---|---|---|---|---|---|
| A. | 100% EMPOL ™ 1008; 60% EDA, 40% DTA | 20.8 | 25.1 | 82.2 | clear, hard gel |
| B. | 100% EMPOL ™ 1008; 75% EDA, 25% DTA | 11.3 | 10.9 | 101.9 | opaque, hard gel |
| C. | 100% EMPOL ™ 1008; 80% EDA, 20 DTA | 10.3 | 8.0 | 146.9 | opaque, hard gel |

In this and other Examples softening point was measured using a Model FP83HT Dropping Point Cell from Mettler Instruments, Mettler-Toledo International, Inc. (CH-8606 Greifensee, Switzerland; www.mt.com), with a heating rate of 1.5° C./min. Techniques to measure acid and amine numbers are well known in the art and need not be described here. See, e.g, AS™ D-465 (1982) from American Society for Testing and Materials (West Conshohocken, Pa.; www.astm.org).

Example 7

Fragrance Release Composition

Figure 2:
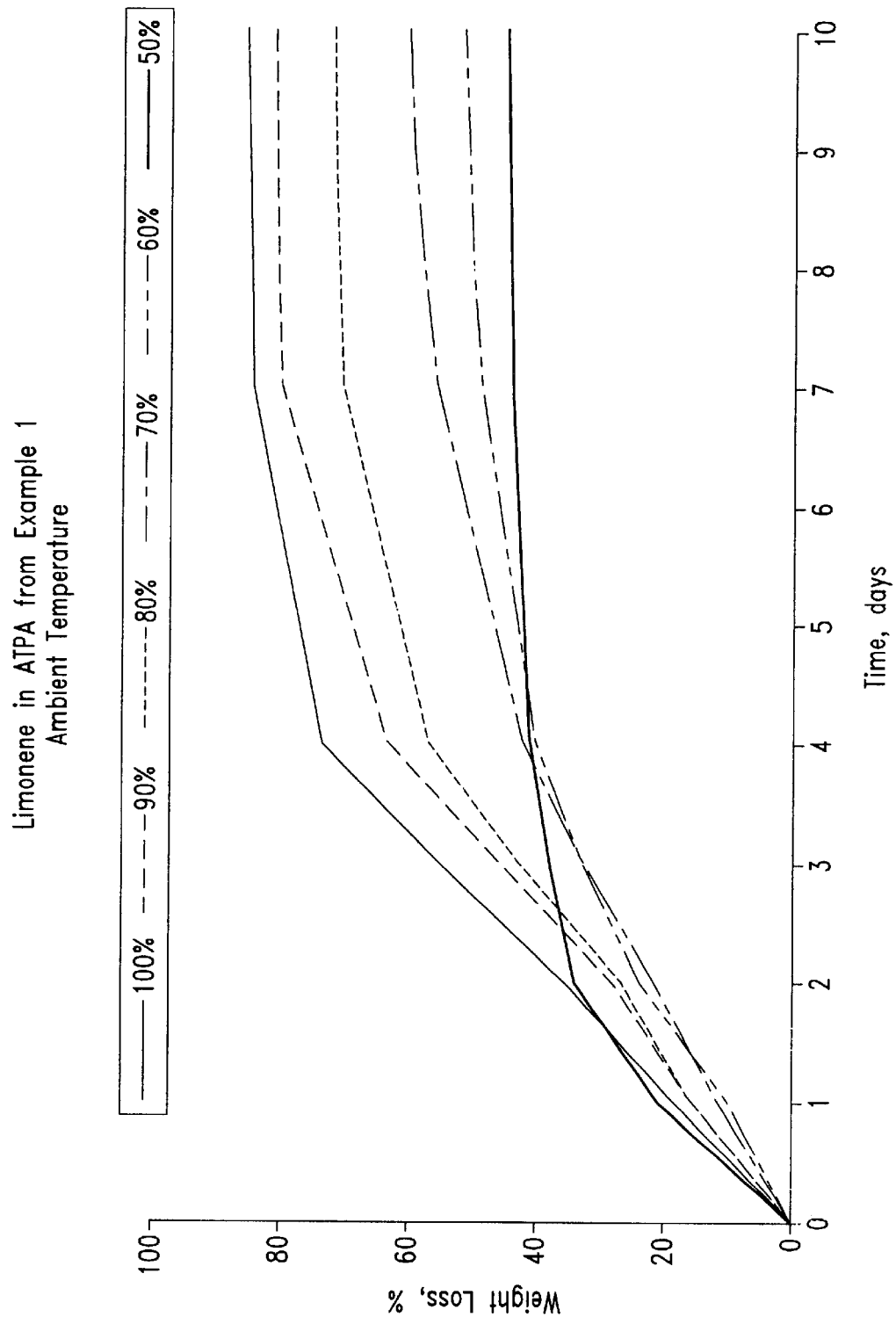
Figure 3:
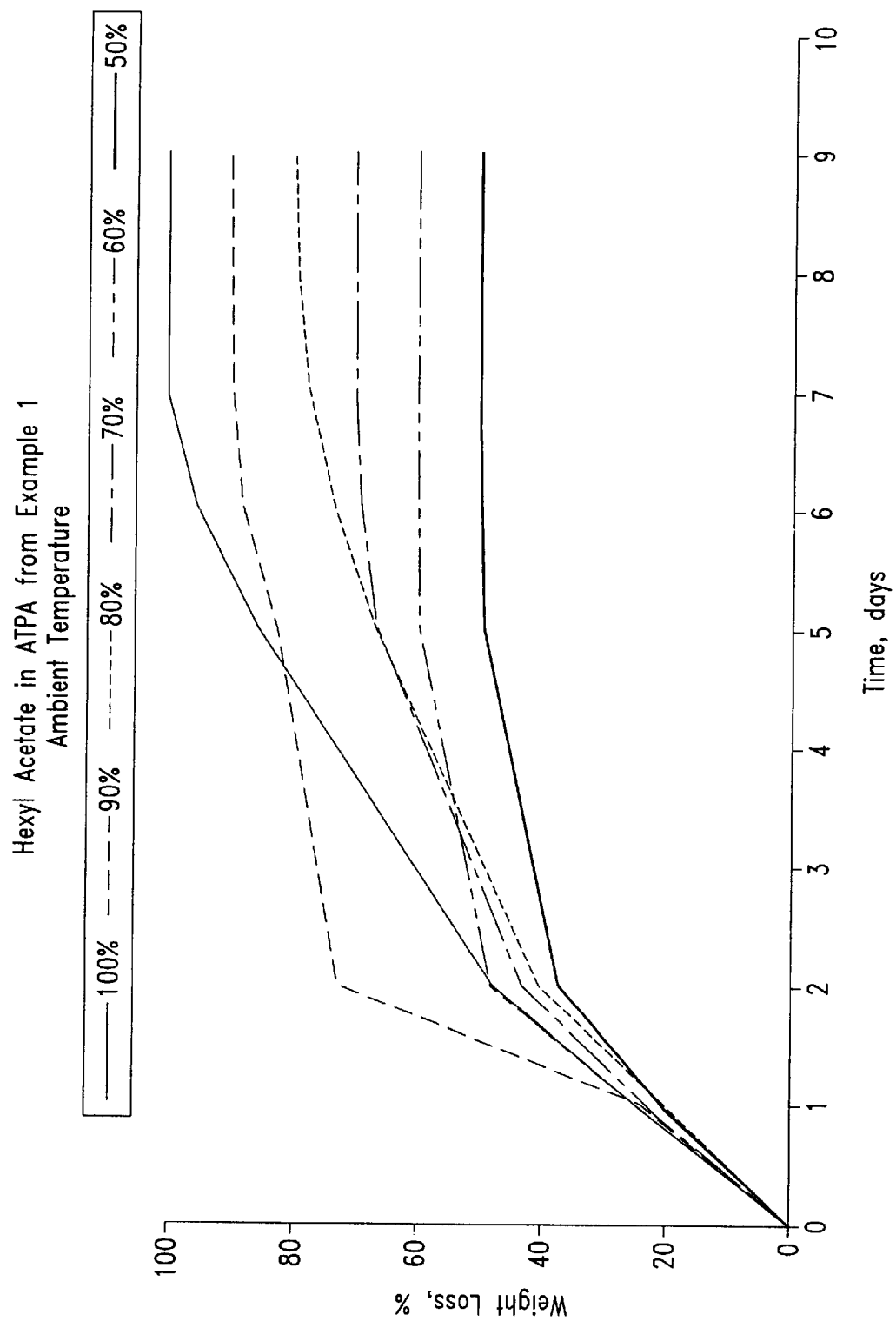

The ATPA resin of Example 1 was combined with three fragrance materials, namely, FOLIAGE from International Flavors & Fragrance (New York N.Y.), hexyl acetate, and limonene. Each fragrance material was combined with ATPA at five different concentrations (50/50 (i.e., 50% fragrance, 50% ATPA, on a weight basis); 60/40; 70/30; 80/20; and 90/10. The gels formed from the ATPA and limonene and hexyl acetate were maintained at ambient temperature (about 23° C.) and the gel formed from ATPA and FOLIAGE was maintained at 40° C. The gels were weighed daily, and the loss of weight was attributed to release and evaporation of fragrance. FIGS. 1, 2 and 3 show in graphical form the fragrance release data, with the x-axis in days since the gel was formed, and the y-axis in % weight loss of compared to the original sample. For comparison, a sample of fragrance only (100%) was monitored for each fragrance.

The data show that ATPA is an effective material for the control of fragrance release into the atmosphere.

Example 8

Formation of Triglyceride Gel using ATPA Gellant

This example shows that triglyceride liquid becomes a gel upon ATPA addition.

A reaction flask was charged with (by weight) 5.0 parts SYLVACLEAR® A200 tertiary amide-terminated polyamide, 6.1 parts soybean oil, and 1.0 part oleic acid, to a total mixture weight of 21.8 grams. The mixture was then heated to 95° C. and blended with stirring for 15 minutes. After cooling, the mixture had the appearance of a solid transparent gel with a yellow tint.

Example 9

Formation of Triglyceride Gel With Fragrance using ATPA Gellant

In this example, the mixture of Example 8 was supplemented with fragrance, and analyzed for appearance.

The gelled product of Example 8 was heated until melted. Then, 0.61 parts (by weight) "Country Apple" fragrance oil (International Flavors & Fragrances, New York) was added, for a total mixture weight of 22.9 grams. The mixture was then stirred with heat for 15 minutes. Upon cooling, the mixture had the appearance of a solid transparent gel with a yellow tint.

Example 10

Formation of Triglyceride Gel from Different Sources, using ATPA Gellant and Fatty Acid In this example, different types of vegetable oil were used in the formation of gels comprising ATPA and fatty acid.

Reaction flasks were charged with (by weight) 45 parts tertiary amide-terminated polyamide resin (prepared from 66.34 wt % PRIPOL™ 1006 dimer acid, 28.78 wt % ADOGEN™ 240SF di(hydrogenated tallow)amine, 4.88 wt % ethylenediamine, and 0.3 wt % ANOX™ 20 antioxidant, essentially following the procedure of Example 1), and 55 parts oil selected from olive, corn, and peanut. Mixtures were then heated and stirred. After cooling, all mixtures had the appearance of solid cloudy gels.

Flask contents were then remelted, and flasks were further charged with additions of myristic acid, 3 parts (by weight) per addition. After each addition of myristic acid, mixtures were heated, then stirred to dissolve contents, then cooled, and then analyzed for appearance (indicated in Table 7). Mixtures were remelted prior to each myristic acid addition.

TABLE 7

|  | Oil used in gel | | |
| --- | --- | --- | --- |
| Gel appearance after | Olive | Corn | Peanut |
| First myristic acid addition | Cloudy | Cloudy | Cloudy |
| Second myristic acid addition | Less cloudy | Cloudy | Cloudy |
| Third myristic acid addition | Clear | Cloudy | Cloudy |

Example 11

Formation of Triglyceride Gel from Different Sources, using ATPA Gellant and Ester In this example, different types of vegetable oil were used in the formation of gels comprising ATPA and fatty acid monoester.

Reaction flasks were charged with (by weight) 4.5 parts tertiary amide-terminated polyamide resin (prepared from 66.34 wt % PRIPOL™ 1006 dimer acid, 28.78 wt % ADOGEN™ 240SF di(hydrogenated tallow)amine, 4.88 wt % ethylenediamine, and 0.3 wt % ANOX™ 20 antioxidant, essentially following the procedure of Example 1), 5.5 parts oil selected from olive, corn, and peanut; and 1.0 part ARIZONA SP™ 100 fatty acid monomeric ester (dicapryl adipate), to a total mixture weight of 11 grams. Mixtures were then heated to a fluid state and stirred. After cooling, mixtures had the appearance of solid cloudy gels. Addition of 1.0 part more ARIZONA SP™ 100 fatty acid monoester did not affect gel cloudiness.

Example 12

Formation of Triglyceride Gel from Different Triglyceride Sources, using ATPA Gellant and Ester In this example, different types of vegetable oil were used in the formation of gels comprising ATPA and ester.

Reaction flasks were charged with (by weight) 90 parts tertiary amide-terminated polyamide resin (formed from 66.34 wt % PRIPOL™ 1006 dimer acid, 28.78 wt % ADOGEN™ 240SF di(hydrogenated tallow)amine, 4.88 wt % ethylenediamine, and 0.3 wt % ANOX™ 20 antioxidant following essentially the procedure of Example 1); 110 parts oil selected from olive, corn, or peanut; and 1 part sorbitan monooleate, to a total mixture weight of 20.1 grams. Mixtures were then heated and stirred. After cooling, mixtures had the appearance of solid cloudy gels. Addition of 1 part more sorbitan monooleate did not affect gel cloudiness.

Example 13

Formation of Vegetable Oil-Based Triglyceride Gel, using ATPA Gellant

In this example, mixtures comprising soybean oil, vegetable shortening, and ATPA gellant were analyzed for appearance.

Reaction flasks were charged with tertiary amide-terminated polyamide resin (prepared from 66.34 wt % PRIPOL™ 1006 dimer acid, 22.78 wt % ADOGEN™ 240SF di(hydrogenated tallow)amine, 4.88 wt % ethylenediamine, and 0.3 wt % ANOX™ 20 antioxidant, essentially following the procedure of Example 1), soybean oil (WESSON® vegetable oil), CRISCO® vegetable shortening (comprising partially hydrogenated cottonseed and/or palm and/or coconut oils), and oleic acid in the weight proportions indicated in Table 8. Mixtures were then heated and stirred to provide a homogeneous solution. Upon cooling, both mixtures had the appearance of solid transparent gels. Mixtures then were frozen, then thawed. After this treatment, both mixtures were cloudy and exhibited cracks in their gel structure. It was also noted with Mixture B that when the initial transparent gel was observed after one day, the gel had acquired a cloudy appearance.

TABLE 8

| Component | Parts (by weight), Mixture A | Parts (by weight), Mixture B |
|---|---|---|
| Resin | 9 | 10 |
| Soybean oil | 5.5 | 5 |
| Vegetable shortening | 5.5 | 5 |
| Oleic acid | 2 | 2 |
| Total Mixture Weight: | 22 grams | 66 grams |

Example 14

Formation of Olive Oil-Based Triglyceride Gel, using ATPA Gellant

In this example, mixtures comprising olive oil, and ATPA gellant were analyzed for appearance.

Reaction flasks were charged with (by weight) 1 part tertiary amide-terminated polyamide resin (prepared from 57.75 wt % EMPOL™ 1008 dimer acid, 39.0 wt % ADOGEN™ 240SF di(hydrogenated tallow)amine, 3.25 wt % ethylenediamine, following essentially the procedure of Example 1), and 1 part olive oil. Mixtures were heated and stirred to a homogeneous fluid state. Upon cooling, the mixture had the appearance of a solid transparent gel.

All publications and patent applications mentioned in this specification are herein incorporated by reference to the same extent as if each individual publication or patent application was specifically and individually incorporated by reference.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A candle comprising a wick and a gel phase, the gel phase comprising a gellant and a liquid that is gelled by the gellant, the gellant comprising a tertiary amide-terminated polyamide resin of the formula (1):

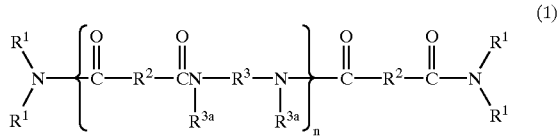

(1)

wherein,
n designates a number of repeating units such that terminal amide groups constitute from 10% to 50% of the total amide groups;
$R^1$ at each occurrence is independently selected from a $C_{1-22}$ hydrocarbon group;
$R^2$ at each occurrence is independently selected from a $C_{2-42}$ hydrocarbon group;
$R^3$ at each occurrence is independently selected from an organic group containing at least two carbon atoms in addition to hydrogen atoms, and optionally containing one or more oxygen and nitrogen atoms; and
$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$ N—$R^3$.

2. The candle of claim 1 wherein terminal amide groups of the formula $C(=O)N(R^1)(R^1)$ constitute from 20% to 35% of the total of the amide groups.

3. The candle of claim 1 wherein n is an integer from 1 to 5.

4. The candle of claim 1 wherein $R^2$ is a $C_{30-42}$ hydrocarbon group having the structure of polymerized fatty acid with the carboxylic acid groups removed.

5. The candle of claim 1 wherein between 1% and 50% of the $R^2$ groups are a $C_{4-19}$ hydrocarbon group.

6. The candle of claim 1 wherein $R^3$ is a $C_{2-36}$ hydrocarbon group and $R^{3a}$ is hydrogen.

7. The candle of claim 1 wherein at least 1% of the —N($R^{3a}$)—$N^3$—N($R^{3a}$)-groups are independently selected from polyalkylene amine,

and

wherein $R_c$ is a $C_{1-3}$alkyl group.

8. The candle of claim 1 further comprising diamide having formula (1) wherein n=0, such that the ratio of terminal amide groups to the total of the amide groups in the resin is from 0.1 to 0.7.

9. The candle of claim 1 wherein the liquid comprises mineral oil.

10. The candle of claim 1 wherein the liquid comprises fatty acid ester.

11. The candle of claim 1 further comprising wax.

12. The candle of claim 1 wherein the resin constitutes 10–40 weight percent of the gel phase, mineral oil constitutes 20–60 weight percent of the gel phase, and fatty acid ester constitutes 10–40 weight percent of the gel phase.

13. The candle of claim 1 wherein the resin constitutes 20–30 weight percent of the gel phase, mineral oil constitutes 30–50 weight percent of the gel phase, and fatty acid ester constitutes 20–30 weight percent of the gel phase.

14. The candle of claim 1 further comprising fragrance.

15. The candle of claim 1 further comprising at least one icon.

16. The candle of claim 1 further comprising a second, visually distinct phase.

17. The candle of claim 16 wherein the second phase comprises solvent and a gellant for the solvent.

18. The candle of claim 16 wherein the second phase comprises wax.

19. A candle comprising a wick and a gel phase, the gel phase comprising a gellant and a liquid that is gelled by the gellant, the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the gellant, wherein at least about 50% of the carboxylic acid equivalents are from polymerized fatty acid and wherein each of x, y and z is greater than 0 such that $0.9 \leq \{x/(y+z)\} \leq 1.1$, and $0.1 \leq \{z/(y+z)\} \leq 0.7$.

20. The candle of claim 19 wherein all equivalents of carboxylic acid come from polymerized fatty acid.

21. The candle of claim 19 wherein the diamine has the formula $H_2N-R^3-NH_2$ and $R^3$ is a $C_{2-36}$ hydrocarbon group.

22. The candle of claim 19 wherein at least 50% of the amine equivalents are contributed by a diamine of the formula $H_2N-R^3-NH_2$ wherein $R^3$ is a $C_{2-36}$ hydrocarbon group, and at least 1% of the amine equivalents are contributed by one or more diamines selected from $$-N\underset{\diagdown\diagup}{\diagup\diagdown}N-$$

and $H_2N-R^3N-NH_2$, wherein $R^3$ is selected from polyalkylene oxide, polyalkylene amine, and the formula $$-\underset{H}{N}-R_c-N\underset{\diagdown\diagup}{\diagup\diagdown}N-R_c-\underset{H}{N}-$$

wherein $R_c$ is a $C_{1-3}$ alkyl group.

23. The candle of claim 19 wherein the secondary amine-containing molecule has the formula $R^1-NH-R^1$, and $R^1$ is independently at each occurrence a $C_{12-22}$ hydrocarbon group.

24. The candle of claim 19 wherein the liquid comprises mineral oil.

25. The candle of claim 19 wherein the liquid comprises fatty acid ester.

26. The candle of claim 19 further comprising wax.

27. The candle of claim 19 wherein the resin constitutes 10–40 weight percent of the gel phase, mineral oil constitutes 20–60 weight percent of the gel phase, and fatty acid ester constitutes 10–40 weight percent of the gel phase.

28. The candle of claim 19 wherein the resin constitutes 20–30 weight percent of the gel phase, mineral oil constitutes 30–50 weight percent of the gel phase, and fatty acid ester constitutes 20–30 weight percent of the gel phase.

29. The candle of claim 19 further comprising fragrance.

30. The candle of claim 19 further comprising at least one icon.

31. The candle of claim 19 further comprising a second, visually distinct phase.

32. The candle of claim 31 wherein the second phase comprises solvent and a gellant for the solvent.

33. The candle of claim 31 wherein the second phase comprises wax.

34. A candle comprising a wick and a gel phase, the gel phase comprising a gellant and a liquid that is gelled by the gellant, the liquid comprising triglyceride, the gellant comprising a tertiary amide-terminated polyamide resin of the formula (1):

$$R^1\diagdown_{R^1}N-\left[\overset{O}{\underset{\|}{C}}-R^2-\overset{O}{\underset{\|}{C}}N-R^3-\underset{R^{3a}}{\overset{|}{N}}\right]_n\overset{O}{\underset{\|}{C}}-R^2-\overset{O}{\underset{\|}{C}}-N\diagup^{R^1}_{R^1}\quad(1)$$

wherein,
n designates a number of repeating units such that terminal amide groups constitute from 10% to 50% of the total amide groups;
$R^1$ at each occurrence is independently selected from a $C_{1-22}$ hydrocarbon group;
$R^2$ at each occurrence is independently selected from a $C_{2-42}$ hydrocarbon group;
$R^3$ at each occurrence is independently selected from an organic group containing at least two carbon atoms in addition to hydrogen atoms, and optionally containing one or more oxygen and nitrogen atoms; and
$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}-N-R^3$.

35. The candle of claim 34 wherein terminal amide groups of the formula $C(=O)N(R^1)(R^1)$ constitute from 20% to 35% of the total of the amide groups.

36. The candle of claim 34 wherein n is an integer from 1 to 5.

37. The candle of claim 34 wherein $R^1$ is a $C_{30-42}$ hydrocarbon group having the structure of polymerized fatty acid with the carboxylic acid groups removed.

38. The candle of claim 34 wherein between 1% and 50% of the $R^2$ groups are a $C_{4-19}$ hydrocarbon group.

39. The candle of claim 34 wherein $R^3$ is a $C_{2-36}$ hydrocarbon group and $R^{3a}$ is hydrogen.

40. The candle of claim 34 wherein the resin constitutes 10–60 weight percent of the gel phase, triglyceride constitutes 20–70 weight percent of the gel phase.

41. The candle of claim 34 further comprising at least one icon or visible gas bubble.

42. The candle of claim 34 further comprising a second, visually distinct phase.

43. The candle of claim 42 wherein the second phase comprises solvent and a gellant for the solvent.

44. The candle of claim 34 wherein the triglyceride is a plant oil.

45. The candle of claim 44 wherein the plant oil is selected from rapeseed, sesame, soya, soybean, safflower, coco, palm, sunflower, canola (low erucic rapeseed), cottonseed, olive, palm kernel, linseed, castor, peanut, and corn oils.

46. The candle of claim 34 wherein the triglyceride is an oil derived from crambe, meadow foam, lesquerella, grapeseed, hemp seed, jojoba, tung, flaxseed, camelina, marine algal, menhaden, sardine, and herring oils.

47. The candle of claim 34 wherein the triglyceride is selected from corn oil, peanut oil, olive oil, soybean oil, and partially hydrogenated cottonseed and/or palm and/or coconut oils.

48. The candle of claim 34 further comprising fatty acid and/or ester-containing compound.

49. The candle of claim 48 wherein the total of fatty acid and/or ester-containing compound contributes 0.1 to 40 weight percent of the candle formulation.

50. A candle comprising a wick and a gel phase, the gel phase comprising a gellant and a liquid that is gelled by the gellant, the liquid comprising triglyceride, the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the gellant, wherein at least about 50% of the carboxylic acid equivalents are from polymerized fatty acid and wherein each of x, y and z is greater than 0 such that $0.9 \leq \{x/(y+z)\} \leq 1.1$, and $0.1 \leq \{z/(y+z)\} \leq 0.7$.

51. The candle of claim 50 wherein all equivalents of carboxylic acid come from polymerized fatty acid.

52. The candle of claim 50 wherein the triglyceride is a plant oil.

53. The candle of claim 52 wherein the plant oil is selected from rapeseed, sesame, soya, soybean, safflower, coco, palm, sunflower, canola (low erucic rapeseed), cottonseed, olive, palm kernel, linseed, castor, peanut, and corn oils.

54. The candle of claim 50 wherein the triglyceride is an oil derived from crambe, meadow foam, lesquerella, grapeseed, hemp seed, jojoba, tung, flaxseed, camelina, marine algal, menhaden, sardine, and herring oils.

55. The candle of claim 50 wherein the triglyceride is selected from corn oil, peanut oil, olive oil, soybean oil, and partially hydrogenated cottonseed and/or palm and/or coconut oils.

56. The candle of claim 50 wherein the resin constitutes 10–60 weight percent of the gel phase, and triglyceride constitutes 20–70 weight percent of the gel phase.

57. The candle of claim 50 further comprising fragrance.

58. The candle of claim 50 further comprising at least one icon or gas bubble.

59. The candle of claim 50 further comprising a second, visually distinct phase.

60. The candle of claim 50 further comprising fatty acid and/or ester-containing compound.

61. The candle of claim 60 wherein the fatty acid and/or ester-containing compound contributes 0.1 to 20 weight percent of the candle formulation.

62. A method for preparing a candle, comprising combining a low polarity liquid with a resin according to claim 1 to provide a gel or pre-gel, and combining the gel or pre-gel with a wick.

63. The method of claim 62 further comprising placing the candle in a container.

64. The method of claim 62 further comprising placing a solid coating on at least a portion of the surface of the candle.

65. The method of claim 62 wherein the low polarity liquid comprises triglyceride.

66. The method of claim 65 further comprising combining fatty acid and/or ester-containing compound.

67. A method for preparing a candle, comprising combining a low polarity liquid with a resin according to claim 19 to provide a gel or pre-gel, and combining the gel or pre-gel with a wick.

68. The method of claim 67 further comprising placing the candle in a container.

69. The method of claim 67 further comprising placing a solid coating on at least a portion of the surface of the candle.

70. The method of claim 67 wherein the low polarity liquid comprises triglyceride.

71. The method of claim 67 further comprising combining fatty acid and/or ester-containing compound.

72. An article comprising a wick, flammable solvent with a flash point ranging from about −15° C. to about 300° C. and tertiary amide-terminated polyamide of formula (1)

$$\text{(1)} \quad \begin{array}{c} R^1 \\ \diagdown \\ N \\ \diagup \\ R^1 \end{array} \!\!\left[ \begin{array}{c} O \\ \| \\ C-R^2-C N-R^3-N \\ \phantom{C-R^2-C}| \phantom{R^3-}| \\ \phantom{C-R^2-C}R^{3a} \phantom{-}R^{3a} \end{array} \right]_n \!\!\begin{array}{c} O \quad O \\ \| \quad \| \\ C-R^2-C-N \\ \diagdown \\ R^1 \\ \diagup \\ R^1 \end{array}$$

wherein,
n designates a number of repeating units such that terminal amide groups constitute from 10% to 50% of the total amide groups;
$R^1$ at each occurrence is independently selected from a $C_{1-22}$ hydrocarbon group;
$R^2$ at each occurrence is independently selected from a $C_{2-42}$ hydrocarbon group;
$R^3$ at each occurrence is independently selected from an organic group containing at least two carbon atoms in addition to hydrogen atoms, and optionally containing one or more oxygen and nitrogen atoms; and
$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

73. The article of claim 72 wherein the flash point ranges from about 40° C. to about 90° C.

74. The article of claim 72 further comprising a coating overlying at least a portion of the article's surface.

75. The article of claim 72 comprising triglyceride.

76. A fragrance-releasing composition comprising a gel phase, the gel phase comprising a fragrance, a gellant, and a liquid that is gelled by the gellant, the gellant comprising a tertiary amide-terminated polyamide resin of the formula (1):

$$\text{(1)} \quad \begin{array}{c} R^1 \\ \diagdown \\ N \\ \diagup \\ R^1 \end{array} \!\!\left[ \begin{array}{c} O \\ \| \\ C-R^2-C N-R^3-N \\ \phantom{C-R^2-C}| \phantom{R^3-}| \\ \phantom{C-R^2-C}R^{3a} \phantom{-}R^{3a} \end{array} \right]_n \!\!\begin{array}{c} O \quad O \\ \| \quad \| \\ C-R^2-C-N \\ \diagdown \\ R^1 \\ \diagup \\ R^1 \end{array}$$

wherein,
n designates a number of repeating units such that terminal amide groups constitute from 10% to 50% of the total amide groups;
$R^1$ at each occurrence is independently selected from a $C_{1-22}$ hydrocarbon group;
$R^2$ at each occurrence is independently selected from a $C_{2-42}$ hydrocarbon group;
$R^3$ at each occurrence is independently selected from an organic group containing at least two carbon atoms in addition to hydrogen atoms, and optionally containing one or more oxygen and nitrogen atoms; and
$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

77. The fragrance-releasing composition of claim 76 comprising triglyceride.

78. A fragrance-releasing composition comprising a gel phase, the gel phase comprising a fragrance material, a gellant, and a liquid that is gelled by the gellant, the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, wherein at least about 50% of the carboxylic acid equivalents are from polymerized fatty acid and wherein each of x, y and z is greater than 0 such that $0.9 \leq \{x/(y+z)\} \leq 1.1$, and $0.1 \leq \{z/(y+z)\} \leq 0.7$.

79. The fragrance-releasing composition of claim 78 comprising triglyceride.

80. A fragrance-releasing composition comprising a gel phase, the gel phase comprising a fragrance and a gellant, where the fragrance is gelled by the gellant, the gellant comprising a tertiary amide-terminated polyamide resin of the formula (1):

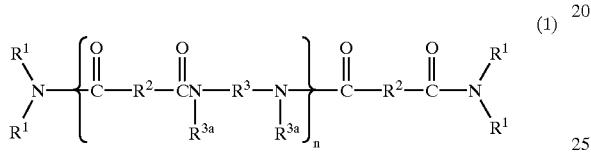

(1)

wherein,
n designates a number of repeating units such that terminal amide groups constitute from 10% to 50% of the total amide groups;
$R^1$ at each occurrence is independently selected from a $C_{1-22}$ hydrocarbon group;
$R^2$ at each occurrence is independently selected from a $C_{2-42}$ hydrocarbon group;
$R^3$ at each occurrence is independently selected from an organic group containing at least two carbon atoms in addition to hydrogen atoms, and optionally containing one or more oxygen and nitrogen atoms; and
$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

81. A fragrance-releasing composition of claim 80 comprising triglyceride.

82. A fragrance-releasing composition comprising a gel phase, the gel phase comprising a fragrance material and a gellant, where the fragrance material is gelled by the gellant, the gellant prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0.

83. The fragrance-releasing composition of claim 82 comprising triglyceride.

84. An article of manufacture comprising a tertiary amide-terminated polyamide resin of the formula (1):

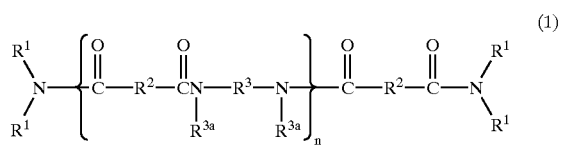

(1)

wherein,
n designates a number of repeating units such that terminal amide groups constitute from 10% to 50% of the total amide groups;
$R^1$ at each occurrence is independently selected from a $C_{1-22}$ hydrocarbon group;
$R^2$ at each occurrence is independently selected from a $C_{2-42}$ hydrocarbon group;
$R^3$ at each occurrence is independently selected from an organic group containing at least two carbon atoms in addition to hydrogen atoms, and optionally containing one or more oxygen and nitrogen atoms; and
$R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

85. The article of manufacture of claim 84 comprising triglyceride.

86. An article of manufacture comprising a tertiary amide-terminated polyamide resin, the resin prepared by a method comprising reacting x equivalents of carboxylic acid from diacid or a reactive equivalent thereof, y equivalents of amine from diamine and z equivalents of a secondary amine-containing monoamine having no reactive functional groups except the secondary amine or a reactive equivalent thereof, where the monoamine is substantially the only monofunctional reactant used to form the resin, and wherein each of x, y and z is greater than 0.

87. The article of manufacture of claim 86 comprising triglyceride.

* * * * *

UNITED STATES PATENT AND TRADEMARK OFFICE
CERTIFICATE OF CORRECTION

PATENT NO.    : 6,503,077 B2
DATED         : January 7, 2003
INVENTOR(S)   : Stephen D. Orth et al.

It is certified that error appears in the above-identified patent and that said Letters Patent is hereby corrected as shown below:

Column 32,
Line 24, "defined in part by $R^{3a}N-R^3$" should be -- defined in part by $R^{3a}-N-R^3$. --
Line 24, "of the $-N(R^{3a})-N^3-N(R^{3a})$-groups" should be corrected to read
-- of the $-N(R^{3a})-R^3-N(R^{3a})$-groups --

Column 33,
Line 27, "$H_2N-R^3N-NH_2$," should be corrected to read -- $H_2N-R^3-NH_2$, --

Column 34,
Line 30, "wherein $R^1$" should be corrected to read -- wherein $R^2$ --

Signed and Sealed this

Sixth Day of May, 2003

JAMES E. ROGAN
*Director of the United States Patent and Trademark Office*